(12) United States Patent
Aoyama

(10) Patent No.: US 9,340,467 B2
(45) Date of Patent: May 17, 2016

(54) ACTUATOR

(71) Applicant: TOYODA GOSEI CO., LTD., Kiyosu-shi, Aichi-ken (JP)

(72) Inventor: Joji Aoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/576,490

(22) Filed: Dec. 19, 2014

(65) Prior Publication Data

US 2015/0183693 A1 Jul. 2, 2015

(30) Foreign Application Priority Data

Dec. 26, 2013 (JP) ................................. 2013-269640

(51) Int. Cl.
*C06D 5/00* (2006.01)
*B60R 21/38* (2011.01)
*F15B 15/19* (2006.01)

(52) U.S. Cl.
CPC . *C06D 5/00* (2013.01); *B60R 21/38* (2013.01); *F15B 15/19* (2013.01)

(58) Field of Classification Search
CPC ...... B60R 21/26; B60R 21/264; B60R 21/38; F42B 3/04; C06D 5/00; F15B 15/1438
USPC ............ 102/530, 531; 89/1.14; 280/733, 734, 280/736, 741, 743.1, 802, 803, 804
See application file for complete search history.

(56) References Cited

U.S. PATENT DOCUMENTS

| 7,475,752 | B2* | 1/2009 | Borg | B60R 21/38 180/274 |
| 7,594,555 | B2* | 9/2009 | Lutter | B60R 21/34 180/274 |
| 8,311,701 | B2* | 11/2012 | Iwai | B60R 21/38 180/69.23 |
| 2004/0112692 | A1* | 6/2004 | Plantan | B60T 17/08 188/170 |
| 2005/0257980 | A1* | 11/2005 | Green | B62D 25/12 180/274 |
| 2006/0118348 | A1 | 6/2006 | Haglund | |
| 2006/0218918 | A1 | 10/2006 | Hirooka et al. | |

(Continued)

FOREIGN PATENT DOCUMENTS

EP 2 583 870 A1 4/2013
JP 2014-31884 A 2/2014
WO 2014/010703 A1 1/2014

OTHER PUBLICATIONS

Extended European Search Report dated Jun. 8, 2015 issued in corresponding EP patent application No. 14197163.0.

*Primary Examiner* — Bret Hayes
(74) *Attorney, Agent, or Firm* — Posz Law Group, PLC

(57) ABSTRACT

An actuator includes a gas generator that generates an actuating gas when actuated, a housing section that houses the gas generator and a pressing section that is deployable with an actuating gas in such a fashion as to move forward relative to the housing section. The pressing section and the housing section are slidable against each other. Either one out of sliding portions of the pressing section and housing section serves as an inner section that is located closer to a central axis of the pressing section than the other whereas the other out of the sliding portions of the pressing section and housing section serves as an outer section that surrounds the inner section. The gas generator is located closer to the central axis than the sliding portion of the pressing section and partially overlaps with a part of the pressing section in an inactive state.

4 Claims, 25 Drawing Sheets

(56) References Cited

U.S. PATENT DOCUMENTS

| | | | | |
|---|---|---|---|---|
| 2006/0290172 A1* | 12/2006 | Hirata | .................... | B60R 21/38 296/187.04 |
| 2009/0266638 A1 | 10/2009 | Hayashi et al. | | |
| 2011/0314809 A1* | 12/2011 | Laspesa | .............. | F15B 15/1476 60/638 |
| 2014/0360350 A1* | 12/2014 | Wilmot | ................. | F15B 21/044 91/357 |

* cited by examiner

ACTUATOR

CROSS REFERENCE TO RELATED APPLICATIONS

The present application claims priority from Japanese Patent Application No. 2013-269640 of Aoyama, filed on Dec. 26, 2013, the disclosure of which is hereby incorporated into the present application by reference.

BACKGROUND OF THE INVENTION

1. Field of the Invention

The present invention relates to an actuator which generates a combustion gas as an actuating gas and is actuated with the gas. By way of example, the actuator of the present invention will be preferably used in a safety system for a vehicle such as a hood lifting device which lifts a vehicle hood in the event of an impact between a pedestrian and a vehicle.

2. Description of Related Art

JP2009-262853 A discloses such an actuator as a part of a hood lifting device which lifts a vehicle hood. The actuator is configured into a piston cylinder and uses a combustion gas which is generated upon ignition of a gas generator, as an actuating gas. In this actuator, a piston rod includes a piston section which slides inside a cylinder, and a rod. The rod extends from the piston section and projects out of the cylinder to raise the vehicle hood. The hood is configured as a receiving member for catching a pedestrian as an object to be protected. When the actuator is actuated, the rod supports the hood and lifts the hood to a predetermined position to catch a pedestrian.

SUMMARY OF THE INVENTION

In the above conventional actuator, the gas generator and the piston section of the piston rod face each other inside a cylinder and are arranged in series along an axial center of the actuator. With this configuration, a working stroke of the actuator is a distance the piston rod travels up to a ceiling wall of the cylinder. That is, the length of the actuator is defined at least by the working stroke of the piston rod and the length of the gas generator, which is long.

The invention contemplates to solve the above-described problem, and has an object to provide an actuator which is short in length although including a gas generator for generating an actuating gas.

The actuator of the invention includes a gas generator that generates an actuating gas when actuated, a housing section and a pressing section. The housing section houses and holds the gas generator. The pressing section is deployable in such a fashion as to move forward relative to the housing section and be separated from the housing section when pressed by an actuating gas generated by the gas generator. The pressing section and housing section respectively include sliding portions to slide against each other. Either one out of the sliding portions of the pressing section and housing section serves as an inner section that is located closer to a moving central axis of the pressing section than the other. The other out of the sliding portions of the pressing section and housing section serves as an outer section that surrounds the inner section. The gas generator is located closer to the moving central axis than the sliding portion of the pressing section and partially overlaps with a part of the pressing section in an inactive state in a direction orthogonal to the moving central axis.

In the actuator of the invention, the gas generator is located closer to the moving central axis of the pressing section than the sliding portion of the pressing section and is housed and held by the housing section in such a manner as to overlap with a part of the pressing section in an inactive state. That is, although the gas generator and the pressing section are arranged in series along the moving central axis of the pressing section, the two overlap in a direction orthogonal to the moving central axis. This configuration will help shorten a length of the actuator by an overlapping amount of the gas generator and pressing section, in comparison with a conventional actuator in which a gas generator and a pressing section are arranged in an unoverlapping fashion.

Therefore, the actuator of the invention will be short in length and compact although including the gas generator for generating an actuating gas. Due to its compact configuration, the actuator of the invention will improve the degree of freedom in mounting when it is mounted on a vehicle for use in a safety system for a vehicle.

It is desired in the actuator of the invention that a sealing member is disposed at the sliding portions of the pressing section and housing section for securing gas sealing property, and that the sealing member is located away from an area to be directly exposed to an actuating gas generated in an initial stage of actuation of the gas generator.

With this configuration, the sealing member will secure gas sealing property of the actuator, and will not be exposed to a hot actuating gas easily generated in an initial stage of actuation of the gas generator, thereby keeping good gas sealing property and being prevented from degrading in performance. As a consequence, the pressing section will deploy with a steady pressing force and the actuator will secure a steady output.

The actuator of the invention may also be configured as follows:

The housing section serves as an inner member while the pressing section serves as an outer member that surrounds the housing section or inner member. The housing section as the inner member includes at the leading end an opening end for releasing an actuating gas and houses the gas generator. The sliding portion of the housing section to slide against the pressing section is located on an outer circumference of the housing section and constitutes the inner section (or an inner sliding portion). The pressing section as the outer member includes a ceiling wall that covers the opening end of the housing section and a circumferential wall that covers a region of the outer circumference of the housing section from an outer peripheral edge of the ceiling wall up to at least an area where the gas generator is located. The sliding portion of the pressing section is comprised of an inner circumference of the circumferential wall and constitutes the outer section (or an outer sliding portion).

In operation of the actuator thus configured, when an actuating gas is generated by the gas generator housed in the housing section (i.e., the inner member), the gas flows out of the opening end of the housing section and pushes the ceiling wall of the pressing section. Then a leading end of the circumferential wall of the pressing section travels from a root region of the housing section, where the gas generator is located, to a vicinity of the opening end while the circumferential wall slides against the outer circumference of the housing section, thus elongating the actuator.

That is, in the actuator configured as described above, the region that receives an actuating gas directly is the ceiling wall of the pressing section (i.e., the outer member). The ceiling wall covers the opening end of the housing section (i.e., the inner member), and is greater in outer diameter than the opening end. Here, if for instance the actuator and a conventional cylinder-type actuator use gas generators with equal outer diameters, a pressure-receiving area of the conventional actuator is an area of a piston whose size is equal to an inner diameter of a cylinder, whereas that of the actuator of the invention is an area of the ceiling wall, which is greater than the former. Therefore, the actuator of the invention will be capable of securing a great output in spite of a small diameter because of a large pressure-receiving area as long as it uses a gas generator which would generate an actuating gas with a high pressure instantly by burning a gunpowder.

With the configuration as described above, the actuator of the invention will be capable of securing a long working stroke although it is short in length and securing a great output although it is not thick in diameter. Therefore, the actuator of the invention will be compact in size and be preferable for use in a hood lifting device, by way of example, which would be mounted in a limited space in a vicinity of a hinge mechanism of a hood panel of a vehicle.

The actuator with the above configuration will desirably include a sealing member between the sliding portions of the pressing section and housing section for securing gas sealing property.

Specifically, with this configuration, at deployment of the pressing section, an actuating gas emitted from the gas generator will be retained by an area defined by the ceiling wall of the pressing section, the circumferential wall of the pressing section and the housing section on the part of the opening end, and the sealing member is located outside of the housing section housing the gas generator, not inside of the housing section. Accordingly, the sealing member will not be exposed to a hot actuating gas easily, thereby keeping good gas sealing property and being prevented from degrading in performance. As a consequence, the pressing section will deploy with a steady pressing force and the actuator will secure a steady output.

If the housing section serves as the inner member while the pressing section serves as the outer member, the following configuration will also be appreciated:

The pressing section includes on an outer circumference thereof a connecting region that extends in a direction orthogonal to the moving central axis so as to be jointed to a pressing-side joint section of a vehicle whereas the housing section is adapted to be jointed to a housing-side joint section of a vehicle, such that the actuator is operable to elongate a distance between the housing-side joint section and the pressing-side joint section.

With this configuration, since the connecting region of the pressing section protrudes from the outer circumference of the pressing section in a direction orthogonal to the moving central axis and is not located in a length direction of the actuator on the moving central axis (axial center), the length of the actuator will be even shorter by a length of the connecting region.

Moreover, in such a configuration that the housing section serves as the inner member while the pressing section serves as the outer member, a packing will desirably be located between an inner circumference of the circumferential wall of the pressing section at a leading end facing away from the ceiling wall and an outer circumference of a root region of the housing section located away from the opening end.

Such packing will help secure water tightness and air tightness at the inner circumference of the circumferential wall of the pressing section (i.e., the outer member). That is, the packing will prevent the entry of foreign particles into the sliding portion, and prevent the rusting of the sliding portion. Therefore, the actuator thus configured will smoothly deploy the pressing section when actuated even after a long standby condition.

Moreover, the housing section may be configured as the outer member while the pressing section is configured as the inner member surrounded by the housing section or outer member. Specifically, the housing section (or outer member) is configured into a cylinder including a bottom wall on which the gas generator is located, a ceiling wall and a circumferential wall that extends from an outer peripheral edge of the bottom wall to the ceiling wall, such that an inner circumference of the circumferential wall is the sliding portion (outer sliding portion) serving as the outer section on the part of the housing section. The pressing section, as the inner member, is configured into a piston rod including a piston section and a rod section that extends from the piston section and is so deployable as to protrude out of the ceiling wall of the cylinder. The piston section includes on the end face facing toward the bottom wall of the housing section a housing recessed region for housing the gas generator. The piston section further includes an opposing wall that forms a ceiling surface of the housing recessed region and opposes the gas generator and a sliding cylinder section that extends from an outer peripheral edge of the opposing wall to a vicinity of the bottom wall of the housing section while covering the gas generator and constitutes an inner circumference of the housing recessed region. An outer circumference of the sliding cylinder section is the inner sliding portion on the part of the pressing section and serves as the inner section to slide against the inner circumference of the circumferential wall of the housing section.

The actuator with this configuration can be used in a similar way to conventional actuators, and can replace a conventional cylinder-type actuator while requiring less mounting space.

The actuator with this configuration will also desirably include a sealing member at the sliding portions of the pressing section and housing section for securing gas sealing property.

With this configuration, at deployment of the pressing section, an actuating gas will be retained in a reservoir area defined by the opposing wall of the housing recessed region of the pressing section, the sliding cylinder section and the circumferential wall of the housing section, and the gas sealing property of the reservoir area will be established by the sealing member located at the outer circumference of the sliding cylinder section and inner circumference of the circumferential wall of the housing section. Since the sealing member is located outside of the sliding cylinder section, not inside of the sliding cylinder section where an actuating gas would be retained (i.e., not in an interior of the housing recessed region), the sealing member will not be exposed to a hot actuating gas generated in an initial stage of actuation of the gas generator, thereby keeping good gas sealing property and being prevented from degrading in performance. As a consequence, the pressing section will deploy with a steady pressing force and the actuator will secure a steady output.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
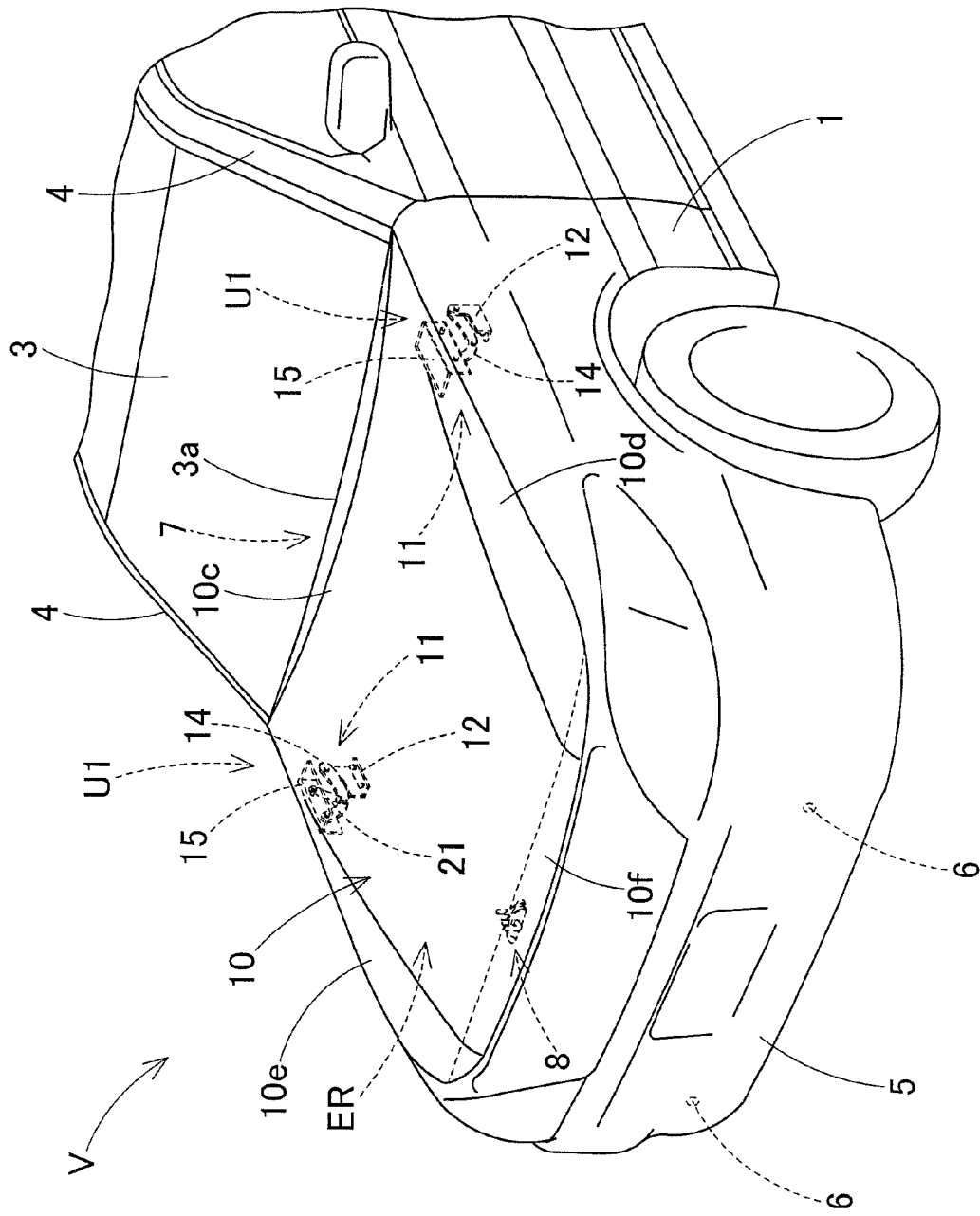
FIG. 1 is a schematic perspective view of a vehicle equipped with a hood lifting device using an actuator according to the first embodiment of the invention.
Figure 2:
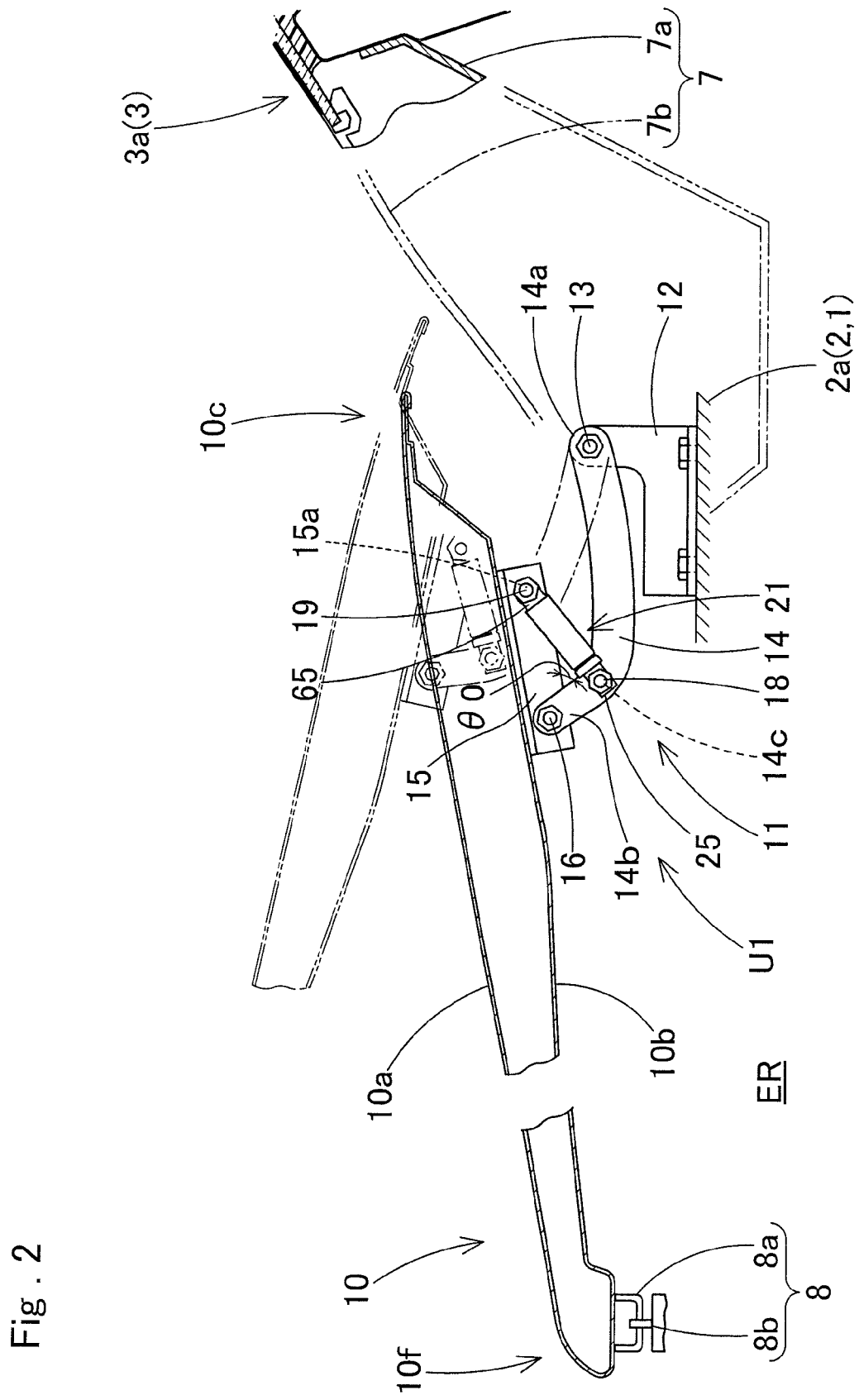
FIG. 2 is a schematic vertical section of the vehicle of FIG. 1.
Figure 3:
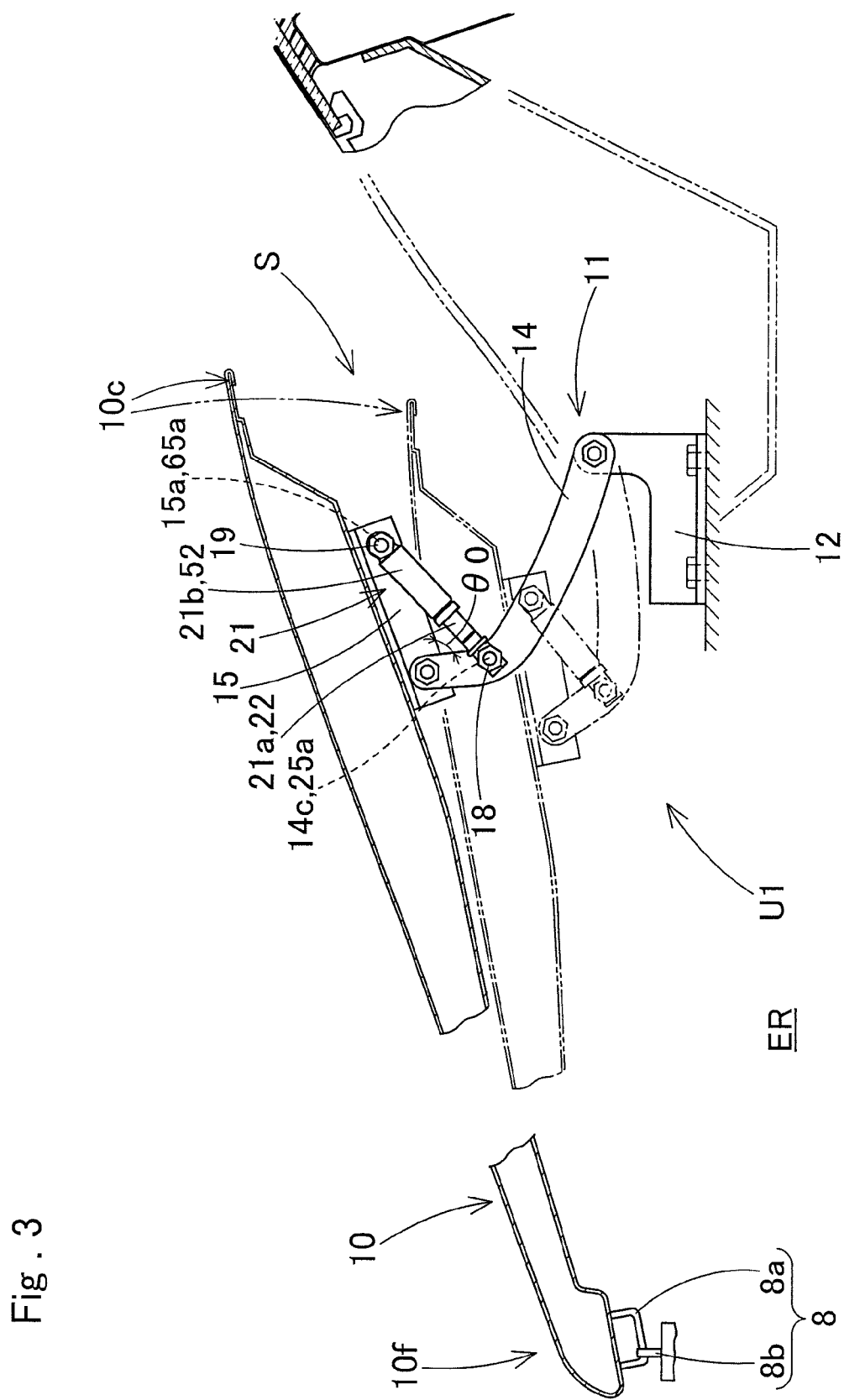
FIG. 3 is a schematic vertical section of the vehicle of FIG. 1 showing the actuator in service.

As shown in FIGS. 1 to 3, an actuator 21 according to the first embodiment of the invention is used in a hood lifting device U1 as a vehicle safety system, and is located at a hinge mechanism 11 at a rear end 10c of a hood panel 10 of a vehicle V.

Unless otherwise specified, front/rear and up/down directions in this specification are intended to refer to front/rear and up/down directions of the vehicle V shown in FIG. 1, and left/right directions correspond to left/right directions when seeing forward from the vehicle V.

In the first embodiment, the vehicle V includes inside a front bumper 5 (FIG. 1) a sensor 6 that detects or predicts an impact against a pedestrian. When an unillustrated control circuit detects a collision between a vehicle V and a pedestrian by a signal fed from the sensor 6, it ignites unillustrated gunpowder of a gas generator 70 of the actuator 21 to generate an actuating gas G. That is, the control circuit actuates the actuator 21 to actuate the hood lifting device U1 (see FIGS. 3 and 5).

As shown in FIGS. 1 and 2, the hood panel 10 covers an engine room ER of the vehicle V and is joined to the body structure 1 of the vehicle V with hinge mechanisms 11 so as to be openable forward. The hinge mechanisms 11 are located at opposite edges 10d and 10e in a left and right direction at the rear end 10c of the hood panel 10. The hood panel 10 is fabricated of plate material of aluminum alloy or the like, and is composed of an outer panel 10a, which forms the top face, and an inner panel 10b, which forms the lower face and is enhanced in strength than the outer panel 10a. The hood panel 10 is plastically deformable so as to absorb a kinetic energy of a pedestrian when impacting against the pedestrian. As shown in FIG. 3, if a collision occurs between the vehicle V and a pedestrian, the actuator 21 will be actuated to form a deformation space S between the rear end 10c of the hood panel 10 as lifted and the engine room ER. The deformation space S will enable the hood panel 10 to increase the amount of plastic deformation upon bending plastic deformation and absorb as much kinetic energy of the pedestrian as possible.

The hinge mechanisms 11 are located at the left edge 10d and right edge 10e of the rear end 10c of the hood panel 10, and are respectively provided with a hinge base 12, a mounting plate 15 and a hinge arm 14. Each of the hinge bases 12 is secured to the vehicle body structure 1 below the rear end 10c of the hood panel 10. Each of the mounting plates 15 is located on the underside of the rear end 10c of the hood panel 10. Each of the hinge arms 14 is pivotally supported by the hinge base 12 and mounting plate 15. More specifically, each of the hinge bases 12 is secured to a mounting flange 2a jointed to a hood ridge reinforcement 2, which is part of the vehicle body structure 1. When the hood panel 10 is opened for normal use, the hinge mechanisms 11 open around the root ends 14a on the part of the hinge bases 12, as indicated by double-dotted lines in FIG. 2.

The hinge arms 14 are so disposed as to extend forward from the root ends 14a to the leading ends 14b. Each of the root ends 14a is jointed to the rear end region of each of the hinge bases 12 with a support shaft 13, such that the hinge arms 14 are rotatable about the support shafts 13. Each of the leading ends 14b is also jointed to the front end region of each of the mounting plates 15 with a support shaft 16, such that the hinge arms 14 are rotatable about the support shafts 16. Each of the support shafts 13 and 16 are arranged along a left and right direction of the vehicle V both on the left and right sides. Each of the actuators 21 is jointed to a joint section 14c of the hinge arm 14 and to a joint section 15a of the mounting plate 15. However, when the hood panel 10 is opened for normal use, the actuators 21 do not extend due to a retaining mechanism for prevention of extension (a lock mechanism for prevention of extension) FR (FR1). In other words, at normal use, the hinge arms 14 do not rotate relative to the mounting plates 15. That is, the hood panel 10 opens about the support shafts 13 at normal use. Specifically, as indicated by solid lines and double-dotted lines in FIG. 2, the hood panel 10 opens forward about the support shafts 13 from the front end 10f along with the rise of the leading ends 14b of the hinge arms 14. If the front end 10f is put down, the hood panel 10 rotates about the support shafts 13 and closes.

The hinge mechanisms 11 on the left and right sides are formed bilaterally symmetric. Opposite ends (connecting regions 25 and 65) of each of the actuators 21 are jointed to the joint section 14c of the hinge arm 14 and joint section 15a of the mounting plate 15, which joint sections 14c and 15a are formed on the sides of the hinge arm 14 and mounting plate 15 facing towards the engine room ER, respectively. The joint section 14c on the hinge arm 14 is located toward the leading end 14b relative to the center between the root end 14a and leading end 14b. The joint section 15a on the mounting plate 15 is located rearward relative to the support shaft 16.

A known hood lock mechanism 8 is provided at the front end 10f of the hood panel 10. The hood lock mechanism 8 includes a lock striker 8a and a latch 8b. The lock striker 8a is secured to an underside of the front end 10f of the hood panel 10, and the latch 8b is provided on the part of the vehicle body structure 1 and holds the lock striker 8a. The latch 8b is so configured as not to release the lock striker 8a unless an unillustrated lever is operated. Therefore, the front end 10f of the hood panel 10 stay closed due to the latch 8b retaining the lock striker 8a even if the rear end 10c of the hood panel 10 is lifted.

As shown in FIGS. 2 and 3, at the rear of the hood 10 is a cowl 7 which includes a cowl panel 7a and a cowl louver 7b. The cowl panel 7a is a part of the vehicle body structure 1 and has a high rigidity. The cowl louver 7b is fabricated of synthetic resin and is located above the cowl panel 7a. The cowl louver 7b is so disposed as to continue at the rear end to a lower region 3a of the front windshield 3. As shown in FIG. 1, front pillars 4 are located on the left and right of the front windshield 3.

Figure 4:
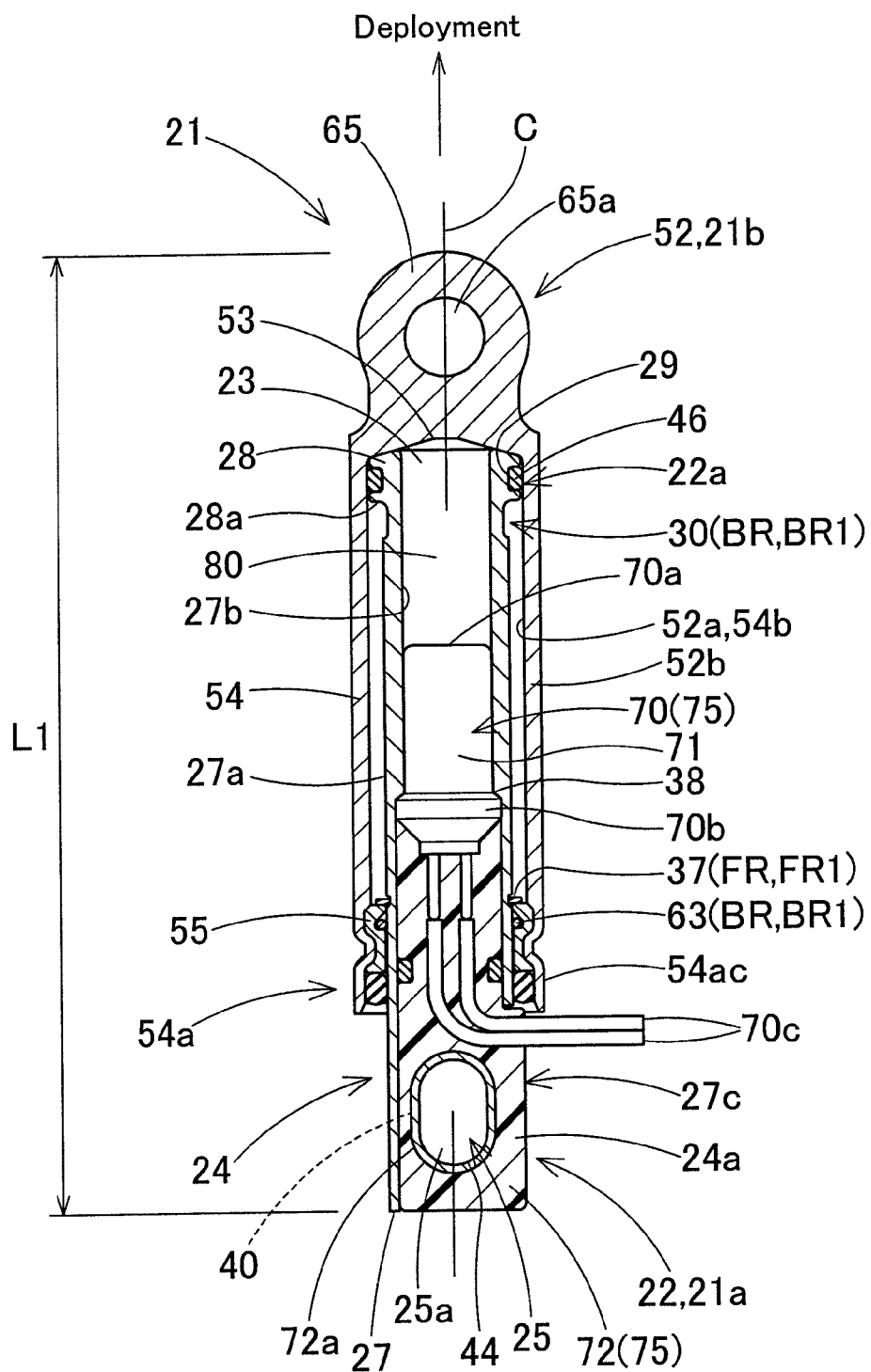
FIG. 4 is a vertical section of the actuator of the first embodiment.
Figure 5:
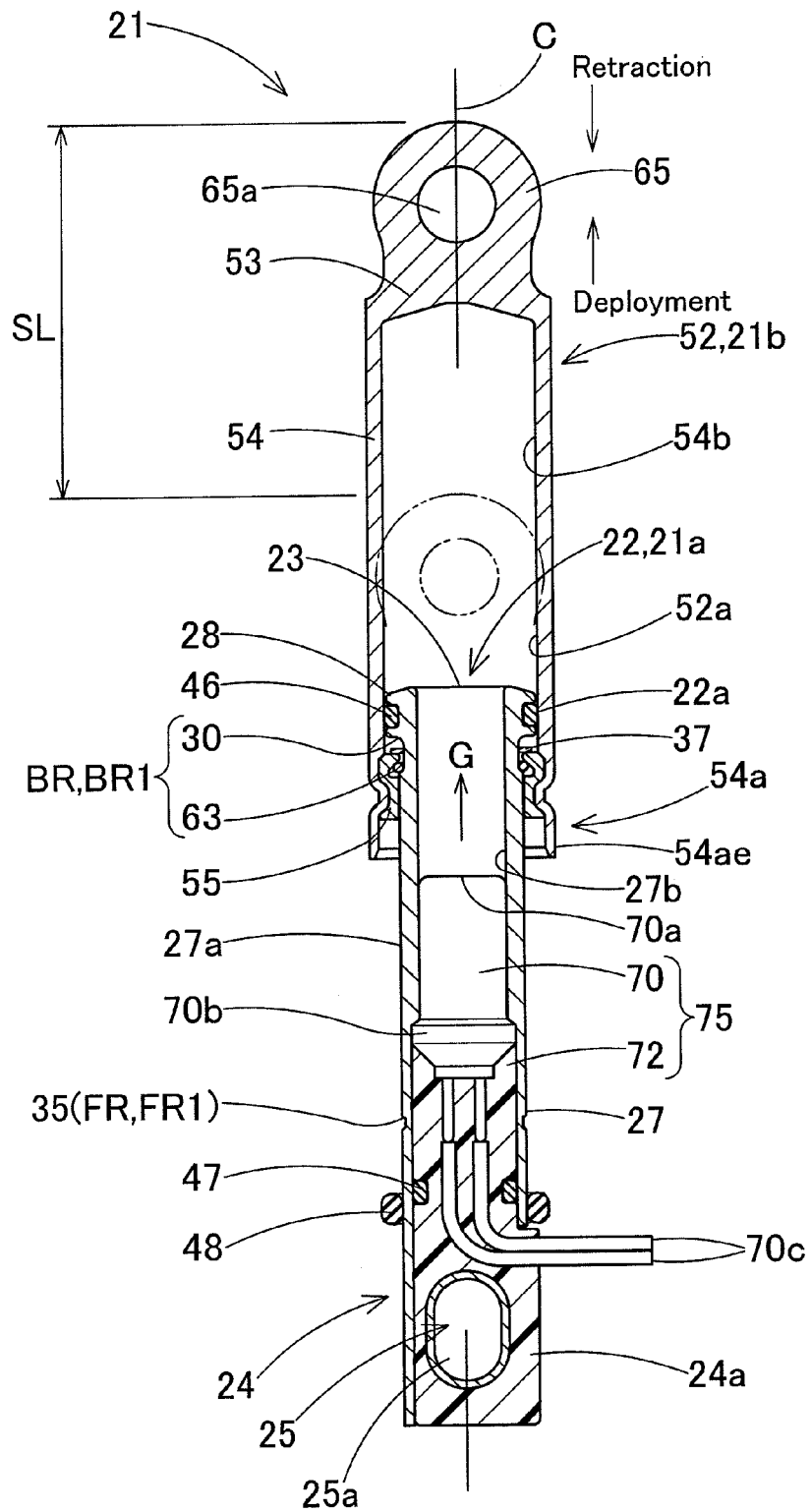
FIG. 5 is a vertical section of the actuator of the first embodiment in service.

As shown in FIGS. 4 and 5, each of the actuators 21 of the first embodiment includes a gas generator 70, a housing section 22 and a pressing section (or moving section) 52. The gas generator 70 generates an actuating gas G when actuated. The housing section 22 houses and holds the gas generator 70. The pressing section 52 is deployable, when pushed by an actuating gas generated by the gas generator 70, in such a fashion as to move forward relative to the housing section 22 and move away from the housing section 22, thereby elongating the actuator 21. In the first embodiment, when the gas generator 70 is actuated and generates an actuating gas G, the pressing section 52 moves obliquely upward and rearward relative to the housing section 22 (FIGS. 2 and 3) and the actuator 21 elongates, such that the joint sections 14c and 15a on the hinge arm 14 and mounting plate 15 are farther separated from each other. At this time, an intersection angle θ0 between the hinge arm 14 and mounting plate 15 is increased and the hood panel 10 is lifted at the rear end 10c while the front end 101 retained by the latch 8b stays unraised.

The gas generator 70 is comprised of a squib, a micro gas generator or the like. When actuated, the gas generator 70 ignites an unillustrated predetermined powder and generates an actuating gas G by combustion of the powder itself or by combustion of a gas generant ignited by the powder. A lead wire 70c extending from an unillustrated control circuit is connected to the root end of the gas generator 70, which is located on the opposite end from the leading end 70a for emitting an actuating gas G, for feeding an actuating electric signal. The gas generator 70 generates a combustion gas in response to an actuating electric signal by igniting and burning a powder housed therein and when necessary, further burning a gas generant. The gas generator 70 emits an actuating gas G from the leading end 70a and feeds it toward a ceiling wall 53 of the pressing section 52. The gas generator 70 of the first embodiment is housed in an inner case 27 of the housing section 22 while having the lead wire 70c extending outwardly. The gas generator 70 is constructed integrally with a resin portion 72, which is formed of such synthetic resin as polyamide, thus provided and housed in the inner case 27 as an assembly 75.

Specifically, the assembly 75 is inserted into the inner case 27 (housing section 22) from an opening 27c formed on the root end 24a until the flange 70b of the gas generator 70 abuts against a later-described step 38 of the inner case 27. A stopper 44, which is formed into an oval tube, is fitted in a through hole 72a formed on the resin portion 72 in order to prevent the assembly 75 from being detached, thus the assembly 75 is housed and held in the housing section 22 (inner case 27). The stopper 44 is fitted in and fixed at an assembling hole 40 formed on the inner case 27.

The housing section 22 is comprised of the inner case (a tubular member) 27 which is generally tubular and formed of such metal as steel. The housing section 22 includes at the leading end (at an upper end shown in FIGS. 4 and 5) an opening end 23 which is a round opening for releasing an actuating gas G there from. The gas generator 70 is located toward the root section 24 facing away from the opening end 23, and the housing section is jointed to the hinge arm 14 at the root end 24a. A connecting region 25 of the housing section 22 to be jointed to the hinge arm 14 includes a connecting hole 25a, into which a pivot member (pivot pin) 18 is fitted, thus the connecting region 25 is pivotally jointed to the joint section 14c of the hinge arm 14. The pivot member 18 is inserted through the connecting hole 25a and rotatably jointed to the joint section 14c of the hinge arm 14. In the first embodiment, the connecting hole 25a is comprised of a through hole formed at an inner circumference of the stopper 44, which is secured to the assembling hole 40 of the inner case 27 in order to hold the assembly 75 in the inner case 27, as described above.

The inner case 27, i.e., the housing section 22, includes a flange 28 at the leading end (proximate the opening end 23) on the outer circumference 27a. The inner case 27 further includes toward the root section 24 on the inner circumference 27b a step 38 which reduces an inner diameter towards the opening end 23. As described above, the flange 70b of the gas generator 70 covered by the resin portion 72 abuts against the step 38. Between the inner circumference 27b of the inner case 27 and the assembly 75 is an annular packing 47 made from rubber, which makes an interior of the inner case 27 on the part of the gas generator 70 gastight.

As shown in FIGS. 4, 7 and 10A to 10C, an annular groove 29 is provided in the flange 28 on the outer circumference 27a. An annular rubber sealing member (packing, O-ring) 46 is fitted in the annular groove 29. The sealing member 46 helps secure gas sealing property at deployment of the pressing section 52.

As shown in FIGS. 4, 7, 10A to 11C, in a vicinity of the flange 28 is a retaining step region (or an annular step region) 30. The retaining step region 30 is a constituent of a retraction-preventing lock mechanism BR (BR1) that prevents the pressing section 52 from retracting after having completed deployment. The retaining step region 30 includes a bottom plane (inner-circumference regulating plane) 32 and a retaining regulating plane 31 that is an inclined plane rising from a region of the inner-circumference regulating plane 32 apart from the flange 28 for retaining a later-described lock ring 63.

An inclined plane of the flange 28 located toward the retaining step region 30 serves as a regulating plane 28a that stops the leading end 54a of the pressing section 52 when the actuator 21 is actuated. That is, the regulating plane 28a prevents the pressing section 52 from falling out of the housing section 22 and limits the extension (i.e., working stroke) of the actuator 21. That is, the flange 28 serves as a stopper when the pressing section 52 deploys.

Figure 6:
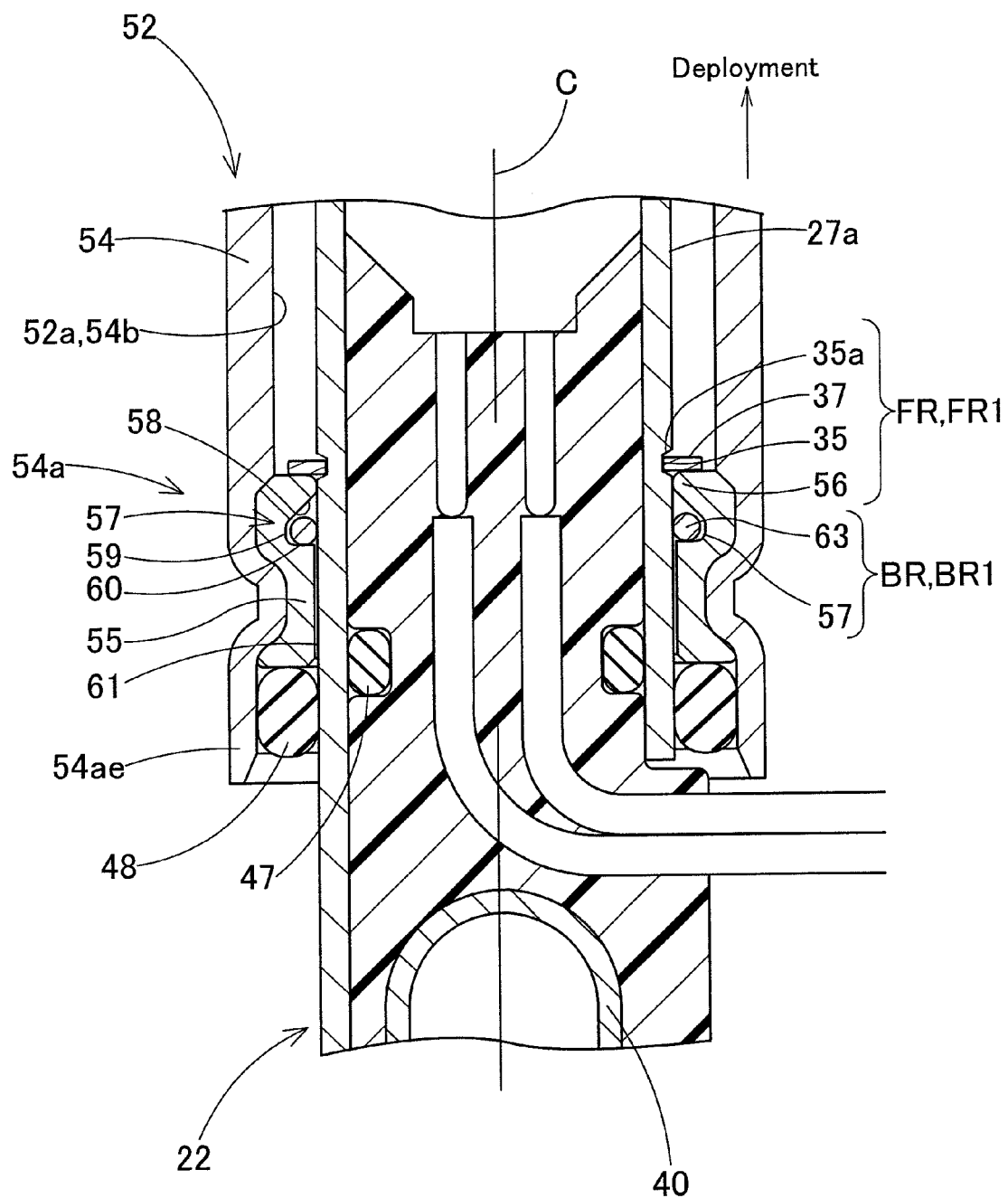
FIG. 6 is an enlarged partial vertical section of the actuator of the first embodiment showing especially a vicinity of a lock ring before operation.
Figure 8A:
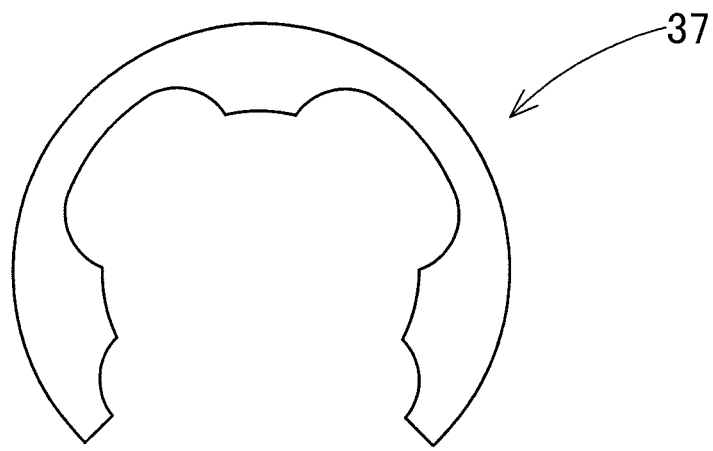
FIG. 8A is a plan view of a retaining ring used in a retaining mechanism for preventing extension of the actuator of the first embodiment.
Figure 8B:
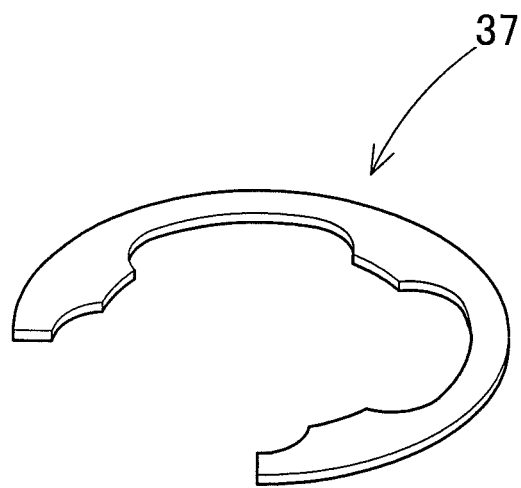
FIG. 8B is a perspective view of the retaining ring of FIG. 8A.

The inner case 27 further includes toward the root end 24a relative to the gas generator 70 on the outer circumference 27a an annular groove 35, as shown in FIGS. 5 and 6. A retaining ring 37 serving as a temporary retainer is fitted in the annular groove 35. As shown in FIG. 8, the retaining ring 37 is comprised of an E-ring which is formed of an elastically deformable flat spring.

The retaining ring 37 is a constituent of a retaining mechanism FR (FR1) serving as a lock mechanism for preventing extension of the actuator 21. When the hood panel 10 is opened/closed for a normal use, the retaining ring 37 is stored in the annular groove 35, abuts against a leading-end flange 56 of a ring holder 55 located at the leading end 54a of the pressing section 52, and regulates the forward movement (deployment) of the pressing section 52. When the gas generator 70 generates an actuating gas G, the leading-end-flange 56 pushes the retaining ring 37, expands the retaining ring 37 radially outwardly with the aid of a peripheral region 35a of the annular groove 35 and lets the ring 37 out of the annular groove 35. Thus the retaining ring 37 stops retaining the pressing section 52 from moving forward and the pressing section 52 deploys with a pressure of the actuating gas G.

When the pressing section 52 has moved completely forward, the retaining ring 37 of the first embodiment is pushed by the leading-end-flange 56 up to the retaining step region 30, and housed in the retaining step region 30 together with the lock ring 63 (FIGS. 10A to 11C).

The retaining mechanism (the extension-preventing lock mechanism) FR1 is composed of the retaining ring (or temporary retainer) 37, the annular groove 35 and the leading-end flange 56. The annular groove 35 is formed on the housing section 22, houses the retaining ring 37 and includes a periphery 35a to help open up the retaining ring 37. The leading-end flange 56 abuts against and is retained by the retaining ring 37 housed in the annular groove 35. Since the leading-end flange 56 pushes the retaining ring 37 out of the annular groove 35 at actuation of the actuator 21 as described above, the leading-end flange 56 serves as a retained portion which concurrently acts to break out of the retention by the retaining ring 37. The deforming stress of the retaining ring 37 pushed and expanded radially outwardly by the leading-end flange 56 to go out of the annular groove 35 is so predetermined as to sufficiently counteract the moment to separate the joint sections 14c and 15a of the hinge arm 14 and mounting plate 15 at opening/closing of the hood panel 10 for a normal use, and to allow radially outwardly expansion of the retaining ring 37 when it is pushed by the leading-end flange 56 at actuation of the gas generator 70.

As described above, the inner case 27 includes toward the root end 24a the assembling hole 40 for receiving the stopper 44. The assembling hole 40 is formed through orthogonally to the axial center C of the actuator 21.

An annular packing 48, which is made from rubber or the like, is further provided on the outer circumference 27a of the inner case 27. The packing 48 is pressed onto an inner circumference of an end 54ae of the leading end region 54a of the pressing section 52 and secures waterproof property inside the pressing section 52 and shuts out foreign particles.

The pressing section (moving section) 52 of the actuator 21 is made from such metal as steel and includes a ceiling wall 53 and a generally tubular circumferential wall 54. The ceiling wall 53 covers the opening end 23 of the housing section 22. The circumferential wall 54 extends toward a retracting direction, i.e., downwardly in FIGS. 4 and 5, from an outer peripheral edge of the ceiling wall 53, and covers a region of the housing section 22 from the opening end 23 and up to at least the root section 24 where the gas generator 70 is located.

The ceiling wall 53 is provided, on the top plane facing away from the opening end 23, with a connecting region 65. The connecting region 65 includes a round connecting hole 65a, and is pivotally jointed to the joint section 15a of the mounting plate 15 with a pivot member (pivot pin) 19 inserted into the connecting hole 65a. The pivot member 19 is put through the connecting hole 65a and pivotally jointed to the joint section 15a of the mounting plate 15.

The circumferential wall 54 includes on an inner circumference of the leading end 54a facing away from the ceiling wall 53 a ring holder 55. An inner circumferential plane 54b of the circumferential wall 54 from the ceiling wall 53 to the ring holder 55 is configured to slide against the sealing member 46 located on the outer circumference of the housing section 22 and to move forward while retaining gas sealing property. That is, the inner circumferential plane 54b is formed into a smooth circular arc face which is concentric to the axial center C of the actuator 21 (i.e., to the moving central axis C of the pressing section 52).

In other words, the housing section 22 and the pressing section 52 have sliding portions to slide against each other, and on the part of the housing section 22, the sealing member 46 serves as a sliding portion 22a while the inner circumferential plane 54b serves as a sliding portion 52a on the part of the pressing section 52 to slide against the sealing member 46. In the actuator 21 of the first embodiment, the sliding portion 22a on the part of the housing section 22 serves as an inner sliding portion (inner section) 22a which is located closer to the moving central axis C, and the housing section 22 constitutes an inner member 21a. On the part of the pressing section 52, the sliding portion 52a serves as an outer sliding portion (outer section) 52a which surrounds the inner sliding portion 22a, and the pressing section 52 constitutes an outer member 21b which surrounds the inner member 21a.

The ring holder 55 is made from such metal as steel and formed into a generally tube. The ring holder 55 is secured to an inner circumference of the leading end 54a of the circumferential wall 54 by swaging. The ring holder 55 includes a leading-end flange 56, a housing groove 57 and a guide plane 61, which are disposed in a descending order from a deployment direction (from the top) of the pressing section 52. The housing groove 57 houses the lock ring 63. The guide plane 61 is a smooth circular arc face concentric to the central axis C.

An inner diameter of the leading-end flange 56 is slightly greater than an outer diameter of the outer circumference 27a of the housing section 22 between the retaining step region (or an annular step region) 30 and the annular groove 35. When the actuator 21 is in an inactive condition, the leading-end flange 56 abuts against the retaining ring 37 housed in the annular groove 35. When the actuator 21 is actuated, the leading-end flange 56 pushes the retaining ring 37 out of the annular groove 35, moves forward and abuts against the flange 28 of the housing section 22 as a stopper with the retaining ring 37 interposed there between. (FIGS. 10A to 11C).

The guide plane 61 slides on the outer circumference 27a of the housing section 22 between the annular step region 30 and annular groove 35 and guides the pressing section 52 forward along the axial center C.

Figure 7:
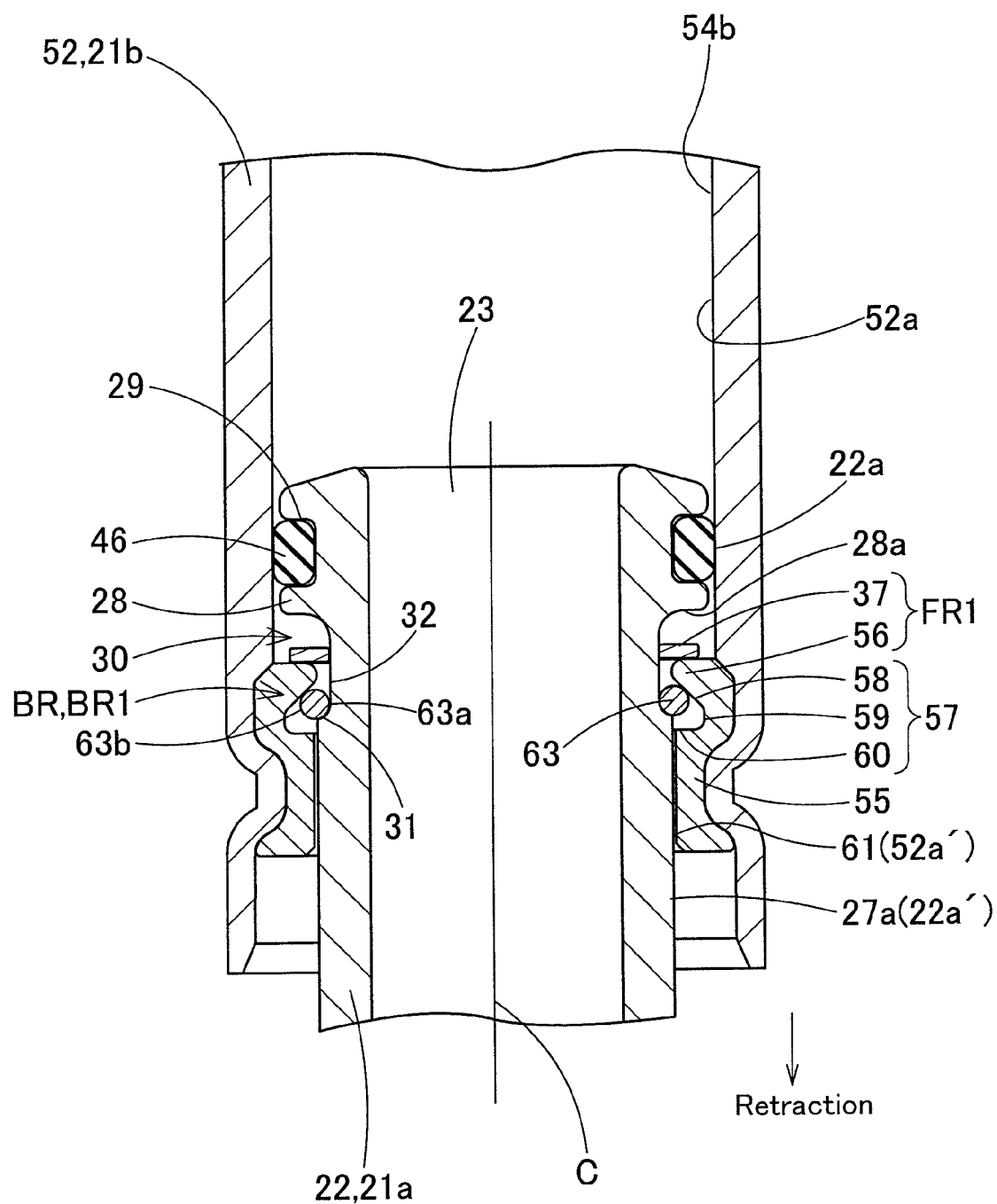
FIG. 7 is an enlarged partial vertical section of the actuator of the first embodiment showing the vicinity of the lock ring after operation.

Since the guide plane 61 slides on the outer circumference 27a of the housing section 22 when the actuator 21 is actuated, it does not have sufficient gas sealing property. However, the outer circumference 27a and guide plane 61 serve as second sliding portions in the housing section 22 and pressing section 52. The outer circumferential plane 27a constitutes an inner sliding portion (inner section) 22a' and the guide plane 61 constitutes an outer sliding portion (outer section) 52a' (FIG. 7).

As shown in FIGS. 6, 7, 10A to 11C, the housing groove 57 houses the lock ring 63. The lock ring 63 is a constituent of the retraction-preventing lock mechanism BR1 that prevents the pressing section 52 from retracting after having completed deployment. The housing groove 57 includes a tapered restricting plane 58, a bottom plane 59 and a step plane 60. The tapered restricting plane 58 enlarges in diameter from the leading-end flange 56. The bottom plane 59 extends from an edge of the tapered restricting plane 58 on a retraction direction (i.e., at a lower side in FIGS. 4 to 7) generally in parallel to the axial center C of the actuator 21. The step plane 60 extends towards the axial center C from an edge of the bottom plane 59 on a retraction direction.

Figure 11A:
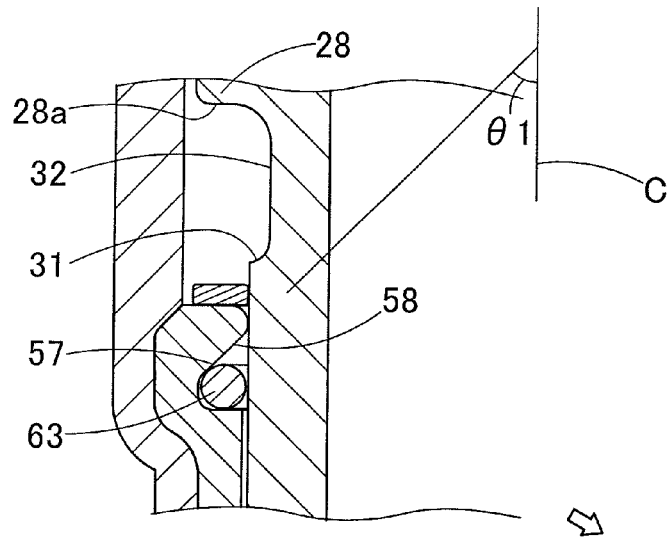
FIGS. 11A to 11C are enlarged partial vertical sections depicting in order the behavior of the lock mechanism at completion of operation of the actuator.
Figure 11B:
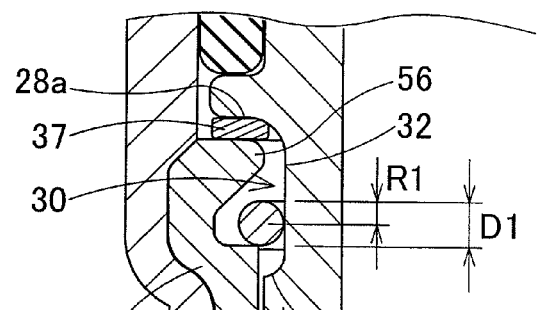

The tapered restricting plane 58 is an inclined plane which is gradually reduced in diameter from the bottom plane 59 towards a deployment direction (upwardly in FIGS. 4 to 7). In the illustrated embodiment, an inclined angle θ1 of the restricting plane 58 against the axial center C is 45° (FIG. 11A).

Figure 9A:
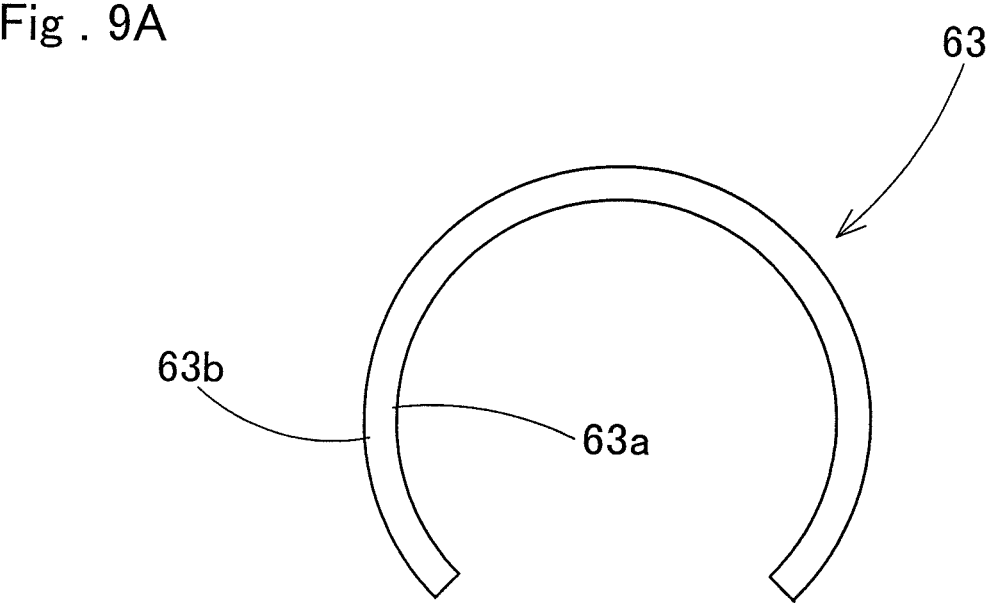
FIG. 9A is a plan view of a lock ring used in a lock mechanism of the actuator of the first embodiment.
Figure 9B:
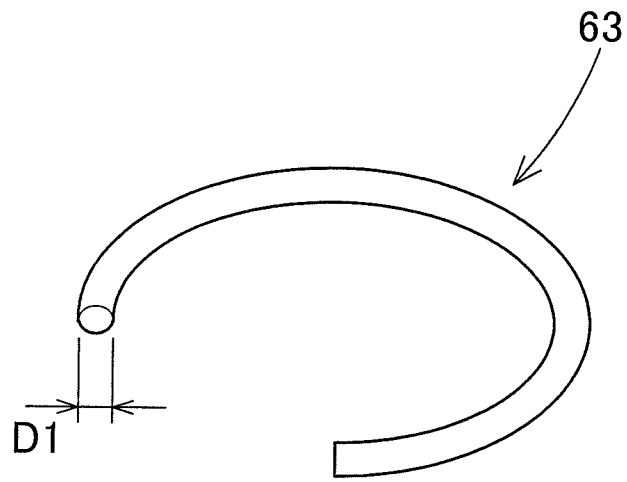
FIG. 9B is a perspective view of the lock ring of FIG. 9A.
Figure 10A:
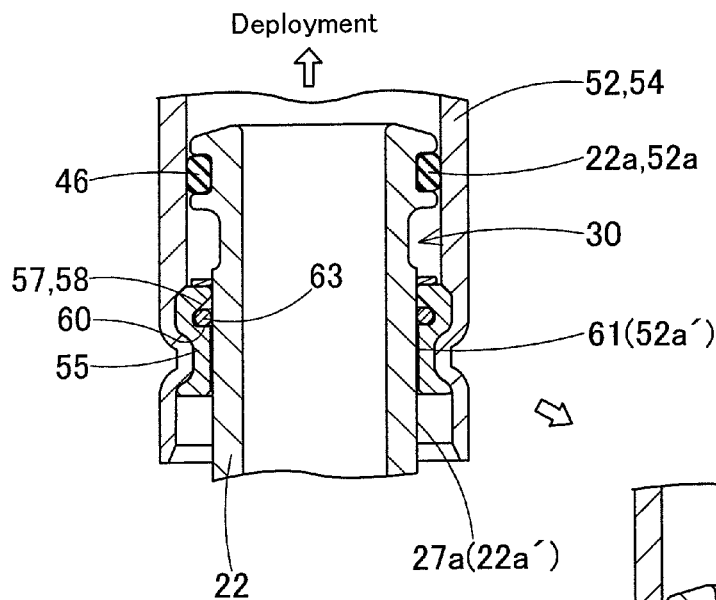
FIGS. 10A to 10C are enlarged partial vertical sections of the actuator of the first embodiment depicting in order the behavior of a vicinity of an opening end of a housing section before and after operation of the actuator.
Figure 10B:
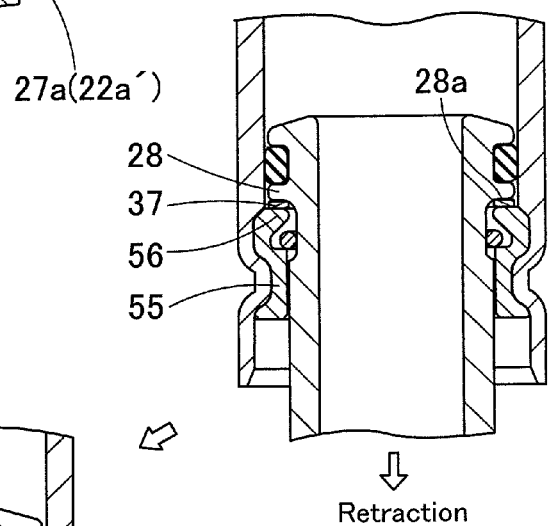
Figure 10C:
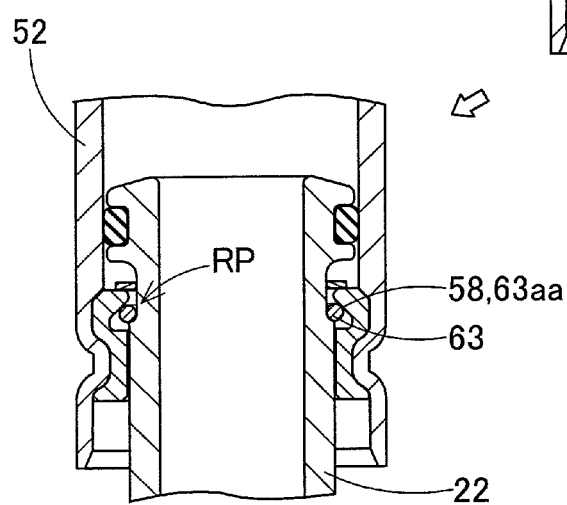

As shown in FIGS. 9A and 9B, the lock ring 63 is formed from an elastically deformable spring steel or the like which has a round cross section. In the illustrated embodiment, the lock ring 63 is comprised of a C-ring. The lock ring 63 is housed in the housing groove 57 in such a state that is radially outwardly expanded to contact the outer circumference 27a of the housing section 22, i.e., in a contractible fashion. When the pressing section 52 is completely deployed, the lock ring 63 is radially inwardly contracted and housed in the retaining step region 30 of the housing section 22. The diameter D1 of a cross-sectional surface of the lock ring 63 is greater than a width B1 (FIG. 11B) of the retaining regulating plane 31 of the retaining step region 30 in the housing section 22 (i.e., a width between the inner-circumference regulating plane 32 and outer circumference 27a). A half of the diameter D1, i.e., the radius R1 of the cross-sectional surface of the lock ring 63, is generally equal to or slightly smaller than the width B1 of the retaining regulating plane 31.

That is, if the diameter D1 is greater than the width B1 of the retaining regulating plane 31, when the lock ring 63 is housed in the retaining step region 30, the lock ring 63 abuts against the inner-circumference regulating plane 32 of the retaining step region 30 and protrudes from the outer circumference 27a of the housing section 22. Further, if the radius R1 is generally equal to or slightly smaller than the width B1 of the retaining regulating plane 31, when the lock ring 63 is housed in the retaining step region 30 and the pressing section 52 tries to retract after having completely deployed, the tapered restricting plane 58 of the leading-end flange 56 of the pressing section 52 bumps against the lock ring 63, but the lock ring 63 hits and is held by the retaining regulating plane 31, and does not come off the retaining regulating plane 31.

As a consequence, although the pressing section 52 is likely to retract after having completely deployed, at a lock position RP (FIG. 11C) of the pressing section 52, the tapered restricting plane 58 of the leading-end flange 56 of the pressing section 52 hits an outer region 63b of the lock ring 63 housed in the retaining step region 30 and an inner region 63a of the lock ring 63 is securely retained by the retaining regulating plane 31, thereby the retraction of the pressing section 52 is prevented. That is, the retraction-preventing lock mechanism BR1 for preventing the pressing section 52 from retracting after having completed deployment is composed of the retaining step region 30 of the housing section 22, which includes the retaining regulating plane 31 and the inner-circumference regulating plane 32, the lock ring (or a retraction preventing element) 63 which is housed in the housing groove 57 of the pressing section 52 and is biased radially inward, and the tapered restricting plane 58 of the housing groove 57 of the pressing section 52.

In the first embodiment, lead wires 70c of the actuators 21 are connected to an unillustrated control circuit. The connecting regions 25 and 65 are jointed to the joint sections 14c of the hinge arms 14 and to the joint sections 15a of the mounting plates 15 with the pivot members 18 and 19 in the hinge mechanisms 11 located at the left and right of the hood panel 10, respectively. Thus the actuators 21 are mounted on the hinge mechanisms 11 and the hood lifting device U1 is mounted on a vehicle V.

If the actuators 21 are actuated after the hood-lifting device U1 of the first embodiment is mounted on a vehicle V, the gas generators 70 generate an actuating gas G. Then as shown in FIG. 3 (double-dotted lines to solid lines) or as shown in FIGS. 4 to 5, the pressing force of the actuating gas G separates the pressing section 52 in each of the actuators 21 away from the housing section 22 and elongates the actuator 21. When the actuators 21 are elongated, an intersection angle θ0 between the hinge arm 14 and mounting plate 15 in each of the actuators 21 is increased, such that the hood panel 10 is lifted at the rear end 10c and an ample deformation space S is provided. As a consequence, the hood panel 10 will be more deformable and capable of receiving a pedestrian with a reduced impact.

In the first embodiment, the working stroke SL of each of the actuators 21 is about 40 mm, and the rear end 10c of the hood panel 10 is lifted by about 80 mm.

In the actuator 21 of the first embodiment, the gas generator 70 is located closer to the moving central axis C than the sliding portion 52a of the pressing section 52 and is housed and held by the housing section 22 in such a manner as to overlap with a portion (in the illustrated embodiment, an intermediate portion of the circumferential wall 54 between the leading end 54a and the ceiling wall 53) 52b of the pressing section 52 in an inactive state. That is, although the gas generator 70 and pressing section 52 are arranged in series along the moving central axis C of the pressing section 52, the two also overlap in a direction orthogonal to the moving central axis C. This configuration will help shorten the length L1 of the actuator 21 by an overlapping amount of the gas generator 70 and pressing section 52 (by a long overlapping amount of the portion 52b of the pressing section 52 and a part of the lead wire 70c and a main body 71 of the gas generator 70 containing unillustrated gunpowder, an ignition device or the like, in the first embodiment), in comparison with a conventional actuator in which a gas generator and a pressing section are arranged in an unoverlapping fashion.

Therefore, the actuator 21 of the first embodiment will be short in length and compact although including the gas generator 70 for generating an actuating gas G. Due to its compact configuration, the actuator 21 will improve the degree of freedom in mounting when it is mounted on a vehicle V for use in a hood lifting device U1 as a safety system.

In the actuator 21 of the first embodiment, the housing section 22 includes at the leading end the opening end 23 for releasing an actuating gas G therefrom and houses the gas generator 70. Further, the housing section 22 includes on the outer circumference the sliding portion (inner sliding portion, inner section) 22*a*, thus serves as the inner member 21*a*. The pressing section 52 includes the ceiling wall 53 covering the opening end 23 of the housing section 22 and the circumferential wall 54 which covers a region of the housing section 22 from the outer circumferential edge of the ceiling wall 53 and up to at least the region where the gas generator 70 is located. The inner circumferential plane 54*b* of the circumferential wall 54 serves as the sliding portion (outer sliding portion, outer section) 52*a* which slides against the inner sliding portion 22*a* of the housing section 22. That is, the pressing section 52 is the outer member 21*b* which surrounds the housing section 22 as the inner member 21*a*.

In operation, when an actuating gas G is generated by the gas generator 70 housed in the housing section 22 (i.e., the inner member 21*b*), the gas flows out of the opening end 23 of the housing section 22 and pushes the ceiling wall 53 of the pressing section 52. Then the leading end 54*a* of the circumferential wall 54 of the pressing section 52 (i.e., the outer member 21*b*) travels from the root region 24 of the housing section 22, where the gas generator 70 is located, to the opening end 23 while the circumferential wall 54 slides against the outer circumference 27*a* of the housing section 22. Thus the actuator 21 elongates in such a manner as to separate the joint section 14*c* of the hinge arm 14 jointed to the housing section 22 (namely, a housing-side joint section in a vehicle V) and the joint section 15*a* of the mounting plate 15 jointed to the pressing section 52 (namely, a pressing-side joint section in a vehicle V) away from each other, and completes deployment.

That is, in the actuator 21 of the first embodiment, the region that receives an actuating gas G directly is the ceiling wall 53 of the pressing section 52 (i.e., outer member 21*b*). The ceiling wall 53 covers the opening end 23 of the housing section 22 (i.e., inner member 21*a*), and is greater in outer diameter than the opening end 23. Here, if for instance the actuator 21 and a conventional cylinder-type actuator use gas generators 70 with equal outer diameters, a pressure-receiving area of the conventional actuator is an area of a piston whose size is equal to an inner diameter of a cylinder, whereas that of the actuator 21 is an area of the ceiling wall 53, which is greater than the former. Therefore, the actuator 21 will be capable of securing a great output in spite of a small diameter because of a large pressure-receiving area, as long as it uses the gas generator 70 which generates an actuating gas G with a high pressure instantly by burning a gunpowder.

With the configuration of the first embodiment, the actuator 21 will be capable of securing a long working stroke although it is short in length and securing a great output although it is not thick in diameter. Due to its compact configuration, the actuator 21 will be preferable for use in a hood lifting device U1, by way of example, which would be mounted in a limited space in a vicinity of a hinge mechanism 11 of a hood panel 10 of a vehicle V.

The actuator 21 of the first embodiment includes at the sliding portions 22*a* and 52*a* of the housing section 22 and pressing section 52 the sealing member 46 for securing gas sealing property.

At deployment of the pressing section 52, an actuating gas G emitted from the gas generator 70 will be retained by an area defined by the ceiling wall 53 of the pressing section 52, the circumferential wall 54 and the housing section 22 on the part of the opening end 23, and the sealing member 46, which is mounted around the outer circumference 27*a* of the housing section 22 at the opening end 23, slides against the inner circumferential plane 54*b* (sliding portion 52*a*) of the circumferential wall 54 and secures gas sealing property of the pressing section 52. Since the sealing member 46 is located outside of the opening end 23, not inside of the housing section 22, the sealing member 46 will not be exposed to a hot actuating gas G easily, thereby keeping good gas sealing property and being prevented from degrading in performance. As a consequence, the pressing section 52 will deploy with a steady pressing force and the actuator 21 will secure a steady output.

The foregoing embodiment has been so described that the sealing member 46 provided in the flange 28 outside of the opening end 23 serves as the inner sliding portion 22*a* on the part of the housing section 22 (inner member 21*a*), and the inner circumferential plane 54*b* of the circumferential wall 54 serves as the outer sliding portion 52*a* on the part of the pressing section 52 (outer member 21*b*) to slide against the inner sliding portion 22*a*. However, the sliding portions to slide against each other on both parts of the housing section and pressing section may also be composed of the guide plane 61 located at the leading end 54*a* of the circumferential wall 54 of the pressing section 52 and the outer circumference 27*a* of the inner case (the tubular member) 27 of the housing section 22. Specifically, if a sealing member is so attached to an inner circumference of the leading end 54*a* as to slide against the outer circumferential plane 27*a* of the housing section 22, the sealing member will serve as an outer sliding portion (outer section) 52*a*' of the pressing section 52 while the outer circumferential plane 27*a* serves as an inner sliding portion (inner section) 22*a*' of the housing section 22. Also in this configuration, the sealing member provided at the sliding portions 22*a*' and 52*a*' of the housing section 22 and pressing section 52 will help secure gas sealing property, and since the sealing member is located on the inner circumference of the leading end 54*a*, away from an area to be exposed to an actuating gas generated in an initial stage of actuation of the gas generator 70, it will not be exposed to a hot actuating gas G, thereby keeping good gas sealing property and being prevented from degrading in performance. As a consequence, the pressing section 52 will move forward with a steady pressing force and the actuator 21 will secure a steady output.

Further, in the actuator 21 of the first embodiment, the packing 48 is located between the inner circumference 54*b* of the end 54*ae* of the pressing section 52 and the outer circumference 27*a* of the root region 24 of the housing section 22. The end 54*ae* is a rim of the leading end 54*a* of the circumferential wall 54 on the part facing away from the ceiling wall 53 in the pressing section 52. The root region 24 is located away from the opening end 23 in the housing section 22.

The packing 48 will help secure water tightness and air tightness at the inner circumference 54*b* of the circumferential wall 54 of the pressing section 52 (i.e., the outer member 21*b*). That is, the packing 48 will prevent the entry of foreign particles into the sliding portion 52*a* or inner circumference 54*b*, and prevent the rusting of the sliding portion 52*a*. Therefore, the actuator 21 will smoothly deploy the pressing section 52 when actuated even after a long standby condition.

Figure 11C:
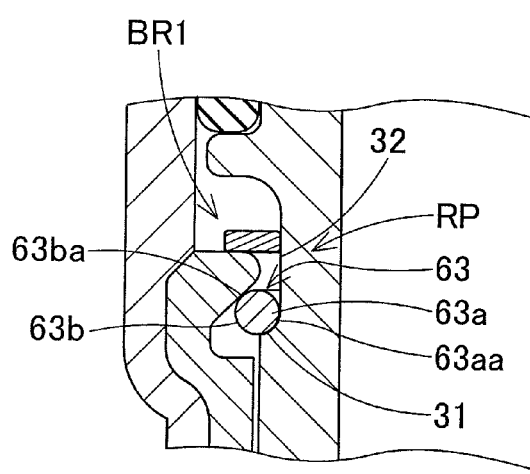

In the actuator 21 according to the first embodiment, as shown in FIGS. 10A to 11C, the lock mechanism BR1 prevents the pressing section 52 from retracting after the pressing section 52 has completed deployment. Specifically, when the pressing section 52 completes deployment, the lock ring 63, which was originally housed in the housing groove 57 of the ring holder 55 at the leading end 54*a* of the pressing section 52, reaches the lock position RP (FIG. 11C) at the retaining step region 30. At this time, the lock ring 63 is radially inwardly contracted relative to the state it was in the housing groove 57 and abuts against the inner-circumference regulating plane 32 of the retaining step region 30. If the pressing section 52 tries to retract from this state, the tapered restricting plane 58 of the pressing section 52 pushes the lock ring 63 onto the retaining regulating plane 31 of the retaining step region 30, as shown in FIGS. 10C and 11C. The lock ring 63 abuts against the retaining regulating plane 31 and is prevented from retracting. An inner plane 63aa of the inner region 63a of the lock ring 63 abuts against the inner-circumference regulating plane 32 of the retaining step region 30 while an outer plane 63ba of the outer region 63b abuts against the tapered restricting plane 58 of the pressing section 52, thus the lock ring 63 is prevented from radially inwardly contracting and outwardly expanding. As a consequence, the lock ring 63 is steadily locked at the lock position RP located between the retaining step region 30 of the housing section 22 and the tapered restricting plane 58 of the pressing section 52. Thus the pressing section 52, whose tapered restricting plane 58 abuts against the outer plane 63ba of the lock ring 63, is locked at the lock position RP and prevented from retracting.

Accordingly, the hood lifting device U1 using the actuator 21 will be capable of receiving a pedestrian with the hood panel 10 kept at the lifted position and having a sufficient deformation space S to allow plastic deformation.

The actuator 21 of the first embodiment further includes on an outer circumference of the opening end 23 of the housing section 22 the flange 28 provided with the sealing member 46 to slide against the inner circumferential plane 54b of the circumferential wall 54 of the pressing section 52. The side plane (or regulating plane) 28a of the flange 28 facing towards a retracting direction is continuous with the retaining step region 30, and the flange 28 abuts against the leading-end flange 56 of the leading end 54a of the circumferential wall 54 with the retaining ring 37 interposed there between, thus serves as a stopper to regulate the deployment of the pressing section 52.

With this configuration, if, at operation of the actuator 21, the leading-end flange 56 of the pressing section 52 still has an inertia force to move farther forward relative to the lock position RP, the leading-end flange 56 abuts against the regulating plane 28a of the flange 28 with the retaining ring 37 interposed, and is steadily halted at the lock position RP. If the lock ring 63 moves forward with an inertia force while contracting in diameter, it also abuts against the regulating plane 28a of the flange 28 with the leading-end flange 56 and retaining ring 37 interposed, thus steadily stays housed in the retaining step region 30 and regulates the retraction smoothly thereafter.

Moreover, the actuator 21 of the first embodiment includes the retaining mechanism FR1 between the housing section 22 and pressing section 52. The retaining mechanism FR1 holds the pressing section 52 relative to the housing section 22 and enables the pressing section 52 to move forward relative to the housing section 22 when an actuating gas G is generated. That is, the retaining mechanism FR1 prevents undue extension of the actuator 21 so as not to expand an intersection angle θ0 between the mounting plate 15 and hinge arm 14. Therefore, the actuator 21 will smoothly allow opening/closing operation of the hood panel 10 for normal use. Further, because of a compact configuration, the actuator 21 will not require a large mounting space, and therefore will be suitably used in the hood lifting device U1.

Especially, as shown in FIGS. 2 and 3, the actuator 21 of the first embodiment, from the joint section 14c on the hinge arm 14 to the joint section 15a on the mounting plate 15, can be mounted on a vehicle in an oblique rear- and upwardly rising fashion close to a horizontal direction, not in a vertical fashion. Therefore, the actuator 21 does not require a large mounting space in an up and down direction, and the hood lifting device U1 using the actuator 21 will be suitably mounted on a vehicle V having a large engine room ER and a limited mounting space in a height direction in vicinities of the hinge mechanisms 11.

Figure 12:
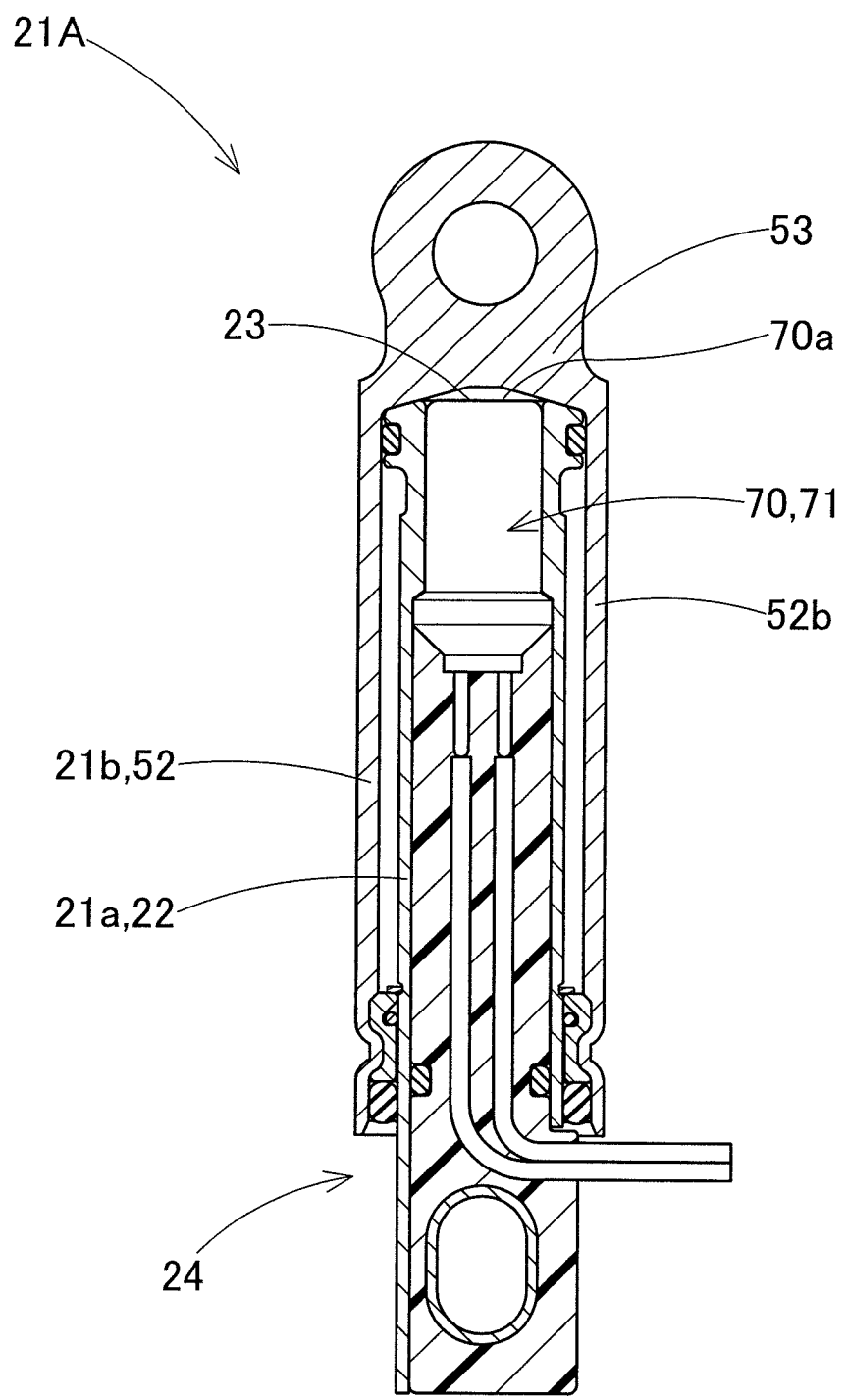
FIG. 12 is a schematic vertical section of a modification of the actuator of the first embodiment.

In the first embodiment, the gas generator 70 is so disposed as to leave a clearance between the leading end 70a for emitting an actuating gas G and the opening end 23 of the housing section 22. However, the opening end 23 may be approximated to the leading end 70a as long as the main body 71 of the gas generator 70 is disposed so away from the opening end 23 towards the root region 24 that the gas generator 70 may not protrude out of the opening end 23. By way of example, the opening end 23 and leading end 70a of the gas generator 70 may be aligned like an actuator 21A shown in FIG. 12. However, as in the first embodiment, if the opening end 23 and the leading end 70a are considerably separated from each other such that a reservoir 80 is formed between the leading end 70a of the gas generator 70 and the opening end 23, i.e., between the leading end 70a and the ceiling wall 53 of the pressing section 52, for retaining an actuating gas G before deployment of the pressing section 52, a rate of change of volume between the leading end 70a and ceiling wall 53 will be smaller at deployment of the pressing section 52 in comparison with an instance where there is no reservoir for retaining an actuating gas before deployment of the pressing section 52. That is, if there is a large reservoir 80 before deployment, the rate of change of volume will be small even if a volume after deployment will be larger. Therefore, the actuator 21 will prevent a pressure lowering of a combustion gas or actuating gas G in the course of deployment of the pressing section 52, and will exert a great pressure and move the pressing section 52 forward even at a vicinity of the completion position of the deployment.

In the first embodiment, the connecting region 25 of the housing section 22 of the actuator 21 is jointed to the hinge arm 14 while the connecting region 65 of the pressing section 52 is jointed to the mounting plate 15. However, the mounting may be reversed, i.e., the connecting region 25 of the housing section 22 may be jointed to the joint section 15a of the mounting plate 15 while the connecting region 65 of the pressing section 52 to the joint section 14c of the hinge arm 14.

Figure 13:
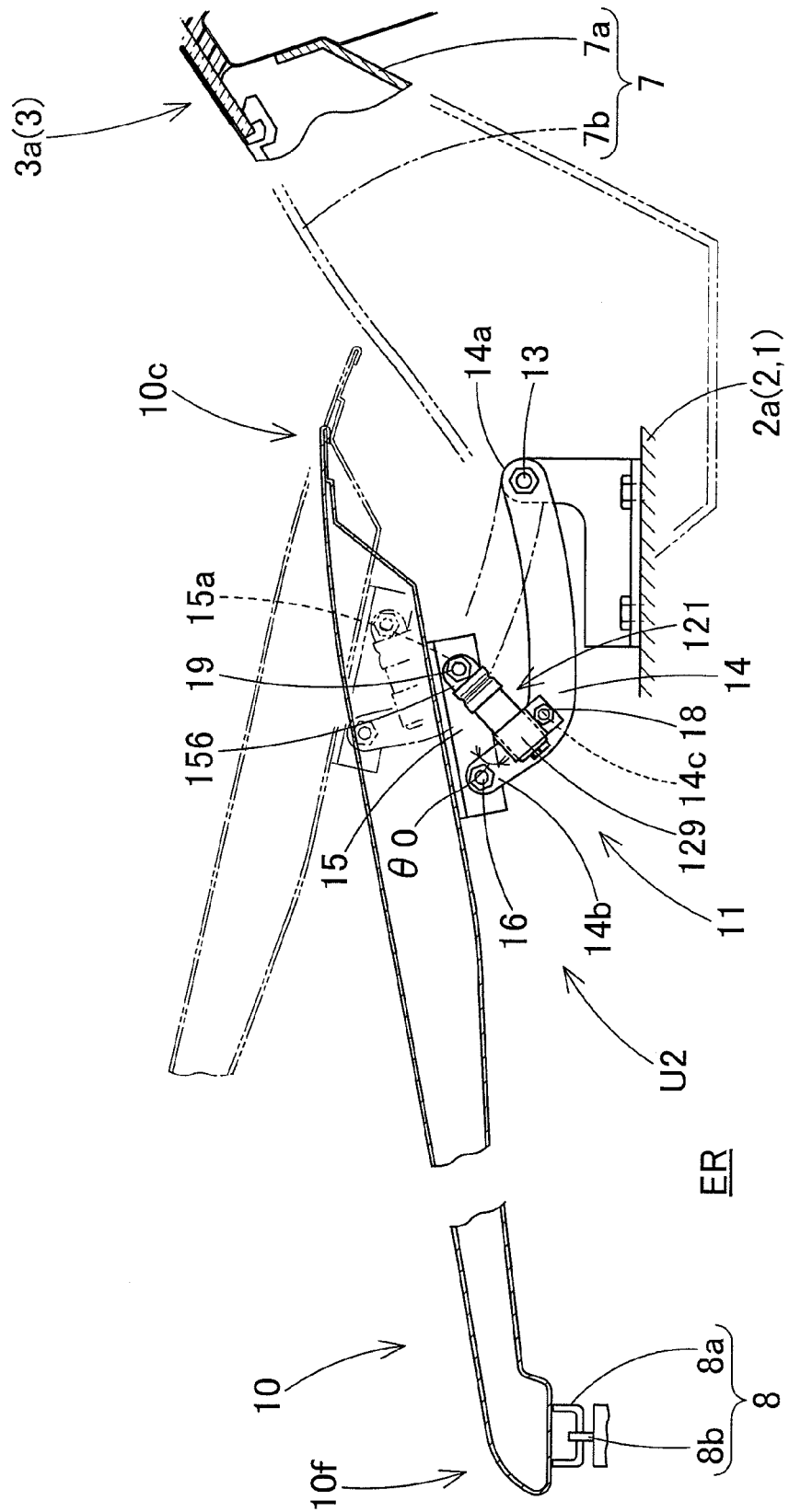
FIG. 13 is a schematic vertical section of a vehicle equipped with a hood lifting mechanism using an actuator according to the second embodiment of the invention.
Figure 14:
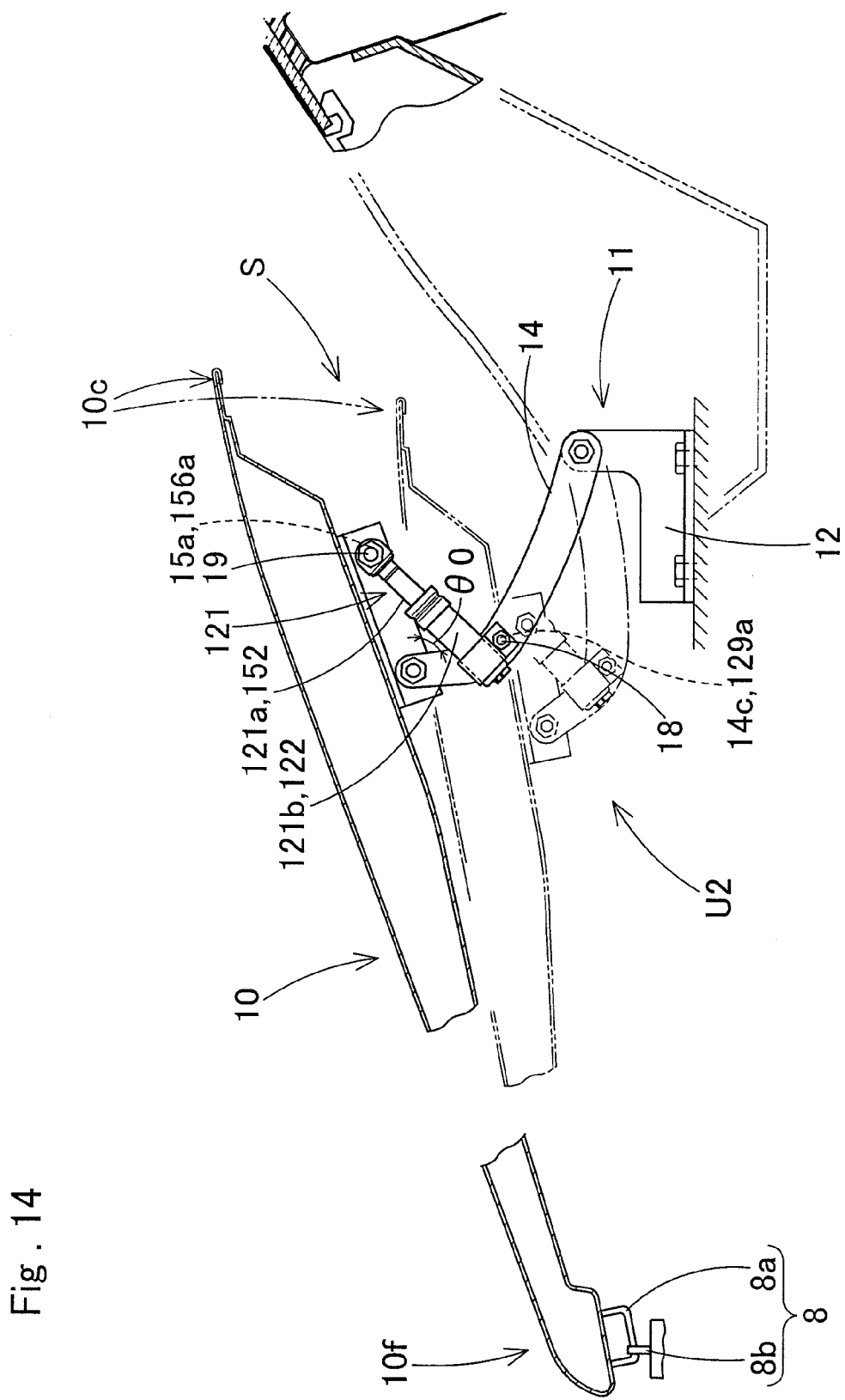
FIG. 14 is a schematic vertical section of the vehicle of FIG. 13 showing the actuator in service.

An actuator 121 according to the second embodiment of the invention is now described. As shown in FIGS. 13 and 14, the actuator 121 of the second embodiment is used in a hood lifting device U2, similarly to the actuator 21 in the first embodiment, and is jointed to a hinge arm 14 and a mounting plate 15 of a hinge mechanism 11.

Figure 15:
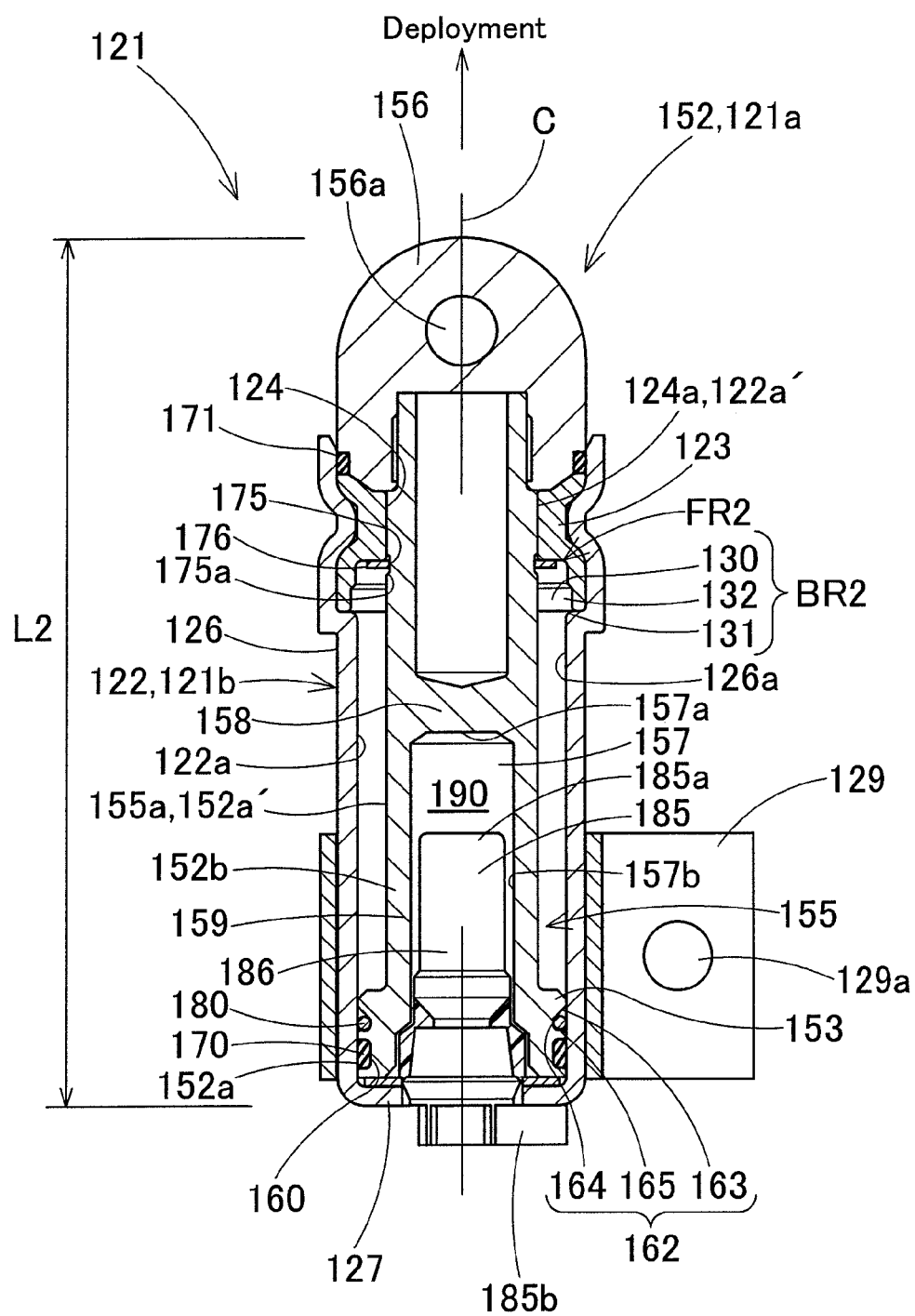
FIG. 15 is a vertical section of the actuator of the second embodiment.
Figure 16:
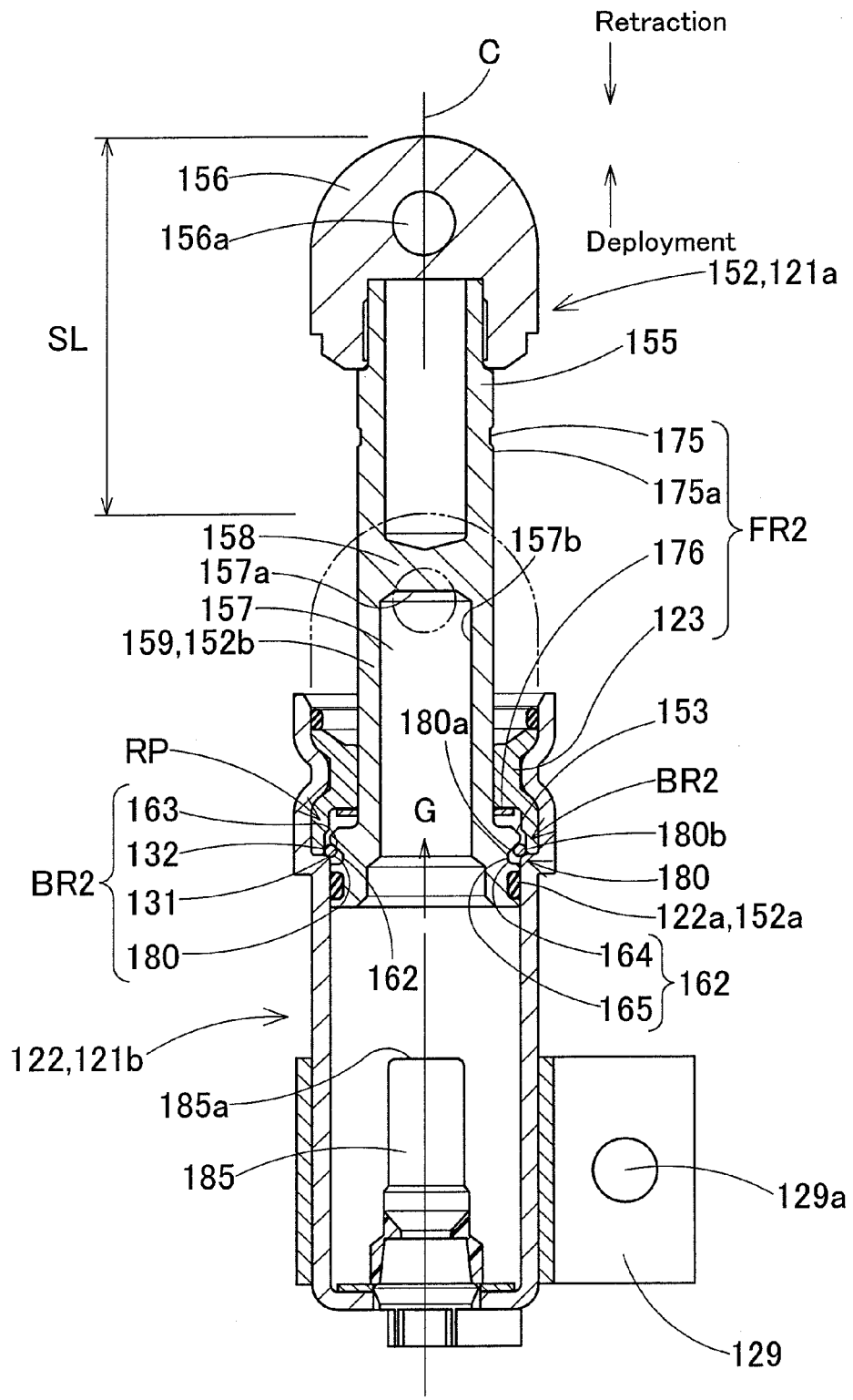
FIG. 16 is a vertical section of the actuator of the second embodiment in service.

As shown in FIGS. 15 and 16, the actuator 121 of the second embodiment is a cylinder-type actuator. A housing section 122 is formed into a cylinder serving as an outer member 121b. The housing section 122 includes a bottom wall 127, a ceiling wall 123, and a circumferential wall 126 which connects the bottom wall 127 and ceiling wall 123. A gas generator 185 is housed and held by the bottom wall 127. The circumferential wall 126 is cylindrical in shape and extends from an outer peripheral edge of the bottom wall 127 to the ceiling wall 123. An inner circumference of the circumferential wall 126 serves as a sliding portion (an outer sliding portion, an outer section) 122a.

The pressing section (moving section) 152 is formed into a piston rod and serves as an inner member 121a. The piston rod or pressing section 152 includes a piston section 153 and a rod section 155. An outer circumference of the piston section 153 serves as a sliding portion (an inner sliding portion, an inner section) 152a slidable against the inner circumference of the circumferential wall 126. The rod section 155 extends from the piston section 153 and protrudes out of an insert hole 124 of the ceiling wall 123.

The piston section 153 includes on the end face facing toward the bottom wall 127 of the cylinder (i.e., the housing section) 122 a housing recessed region 157 for housing the gas generator 185. The piston section 153 further includes an opposing wall 158 and a sliding cylinder section 159. The opposing wall 158 forms a ceiling surface 157a of the housing recessed region 157 and opposes the gas generator 185. The sliding cylinder section 159 extends from an outer peripheral edge of the opposing wall 158 to the bottom wall 127 of the cylinder 122 while covering the gas generator 185, and constitutes an inner circumference 157b of the housing recessed region 157. An outer circumference of the sliding cylinder section 159 serves as the inner sliding portion 152a.

In a similar fashion to the first embodiment, the gas generator 185 is comprised of a squib, a micro gas generator or the like. When actuated, the gas generator 185 ignites an unillustrated predetermined powder and generates an actuating gas G by combustion of the powder itself or by combustion of a gas generant ignited by the powder. A root region of the gas generator 185 located away from the leading end 185a emitting an actuating gas G protrudes out of the bottom wall 127, and a connector 185b is attached thereto. An unillustrated lead wire extending from a predetermined control circuit is connected to the connector 185b for feeding an actuating electric signal. In a similar fashion to the first embodiment, the gas generator 185 generates a combustion gas in response to an actuating electric signal fed from the control circuit by igniting and burning a powder housed therein and when necessary, further burning a gas generant. The gas generator 185 emits an actuating gas G from the leading end 185a and feeds it toward the housing recessed region 157 of the piston section 153.

When the gas generator 185 generates an actuating gas G, the piston rod or pressing section 152 moves obliquely upward and rearward relative to the cylinder or housing section 122 (FIGS. 13 and 14) and the actuator 121 elongates, such that joint sections 14c and 15a on the hinge arm 14 and mounting plate 15 are farther separated from each other and an intersection angle θ0 between the hinge arm 14 and mounting plate 15 is increased, thus the hood panel 10 is lifted at the rear end 10c while the front end 10f retained by a latch 8b stays unraised.

The circumferential wall 126 of the cylinder (housing section) 122 is formed of a metal pipe member. A cap member forming the ceiling wall 123 is crimped down against and firmly jointed to this pipe member. A root region of the pipe member (i.e. of the circumferential wall 126) facing away from the cap member is swaged into the bottom wall 127. A retaining step region (an annular groove) 130 is formed in a vicinity of the ceiling wall 123 on an inner circumference of the circumferential wall 126 for retaining a lock ring 180 which is a constituent of a retraction-preventing lock mechanism BR (BR2). The retaining step region 130 includes an outer-circumference regulating plane 132 which is a bottom plane of the annular groove 130 and prevents the lock ring 180 from radially outwardly expanding and a retaining regulating plane 131 which extends from an edge of the outer-circumference regulating plane 132 in a retracting direction of the piston rod 152 towards an axial center C for retaining the lock ring 180.

At deployment of the piston rod 152, the ceiling wall 123 abuts against the piston section 153 of the piston rod 152 with a retaining ring 176 interposed there between, thus serves as a stopper to limit a working stroke of the actuator 121.

A connecting region 129 is fixed to an outer circumference of the bottom wall 127 of the cylinder 122 for joint with the joint section (or a housing-side joint section) 14c. The connecting region 129 includes a connecting hole 129 for receiving a pivot member 18, and is pivotally jointed to the joint section 14c of the hinge arm 14 with the pivot member 18.

The piston rod or pressing section 152 includes on an outer circumference of the piston section 153 a housing groove 162 and a recessed groove 160, which are disposed in order toward a retracting direction. The lock ring 180 is housed in the housing groove 162 and a sealing member 170 is fitted in the recessed groove 160. The sealing member 170 is formed of an O-ring and slides against the sliding portion (i.e., the outer sliding portion) 122a of the inner circumference 126a of the circumferential wall 126 of the cylinder 122 while securing gas sealing property at deployment of the piston section 153. That is, the sealing member 170 constitutes the inner sliding portion 152a to slide against the outer sliding portion 122a of the cylinder 122.

In addition, the rod section 155 of the piston rod 152 slides against an inner circumference 124a of the insert hole 124 at the ceiling wall 123 of the cylinder 122 at operation of the actuator 121. Accordingly, an outer circumference 155a of the rod section 155 and the inner circumference 124a of the insert hole 124 constitute second sliding portions in the housing section 122 and pressing section 152 although not having sufficient gas sealing property. That is, the outer circumference 155a constitutes an inner sliding portion 152a' and the inner circumference 124a constitutes an outer sliding portion 122a' that surrounds the inner sliding portion 152a'.

The housing groove 162 houses the lock ring 180, and includes a bottom wall 164, a tapered restricting plane 163 and a step plane 165. The tapered restricting plane 163 is an inclined plane extending toward the deployment direction (i.e., upward in FIGS. 15 and 16) from a rim of the bottom plane 164 in a deployment direction while radially outwardly expanding. An inclined angle θ1 of the restricting plane 163 against an axial center C is 45°. The step plane 165 extends away from the axial center C from a rim of the bottom plane 164 on a retraction direction.

The lock ring 180 is a constituent of the retraction-preventing lock mechanism BR2 that prevents the piston rod 152 from retracting after the actuator 121 has completed operation. The lock ring 180 is formed from an elastically deformable spring steel or the like which has a round cross section. In the illustrated embodiment, the lock ring 180 is comprised of a C-ring. The lock ring 180 is housed in the housing groove 162 in such a state that is radially inwardly contracted to contact the inner circumference 126a of the cylinder 122. When the piston rod 152 is completely deployed, the lock ring 180 is radially outwardly expanded and housed in the retaining step region 130 of the cylinder 122. A diameter of a cross-sectional surface of the lock ring 180 is greater than a width of the retaining regulating plane 131 of the retaining step region 130 (i.e., a width between the outer-circumference regulating plane 132 and inner circumference 126a). A half of the diameter of the lock ring 180, i.e., a radius of the cross-sectional surface of the lock ring 180, is generally equal to or slightly smaller than the width of the retaining regulating plane 131.

That is, if the diameter of the lock ring 180 is greater than the width of the retaining regulating plane 131, when the lock ring 180 is housed in the retaining step region 130, the lock ring 180 abuts against the outer-circumference regulating plane 132 of the retaining step region 130 and protrudes from the inner circumference 126a of the cylinder 122. Further, if the radius of the lock ring is generally equal to or slightly smaller than the width of the retaining regulating plane 131, when the lock ring 180 is housed in the retaining step region 130 and the piston rod 152 tries to retract after having completely deployed, the tapered restricting plane 163 of the piston rod 152 bumps against the lock ring 180, but the lock ring 180 hits and is held by the retaining regulating plane 131, and does not come off the retaining regulating plane 131.

As a consequence, although the piston rod 152 is likely to retract after having completely deployed, at a lock position RP (FIG. 16) of the piston rod 152, the tapered restricting plane 163 of the piston rod 152 hits an inner region 180a of the lock ring 180 housed in the retaining step region 130 and an outer region 180b of the lock ring 180 is securely retained by the retaining regulating plane 131, thereby the retraction of the piston rod 152 is prevented. That is, in the second embodiment, the retraction-preventing lock mechanism BR2 for preventing the piston rod 152 from retracting after having completed deployment is composed of the retaining step region 130 of the cylinder 122, which includes the retaining regulating plane 131 and the outer-circumference regulating plane 132, the lock ring (or a retraction preventing element) 180 which is housed in the housing groove 162 of the piston rod 152 in a radially outwardly deformable fashion, and the tapered restricting plane 163 of the piston rod 152.

The piston rod 152 further includes on the outer circumference of the rod section 155 proximate an underside of the ceiling wall 123 an annular groove 175 for housing a retaining ring 176. The retaining ring 176 is a constituent of an extension-preventing lock mechanism FR (FR2) and is comprised of an E-ring which is formed of an elastically deformable flat spring.

When the hood panel 10 is opened/closed for a normal use, the retaining ring 176 is stored in the annular groove 175, abuts against the ceiling wall 123 of the cylinder 122, and regulates the forward movement deployment) of the piston rod 152. When the gas generator 185 generates an actuating gas G, an edge 175a of the annular groove 175 on a retraction direction pushes the retaining ring 176 along with the deployment of the piston rod 152, expands the ring 176 radially outwardly and lets the ring 176 out of the annular groove 175. Thus the retaining ring 176 stops retaining the piston rod 152 from moving toward a deployment direction and the piston rod 152 deploys with a pressure of the actuating gas G.

The extension-preventing lock mechanism (or a retaining mechanism) FR2 is composed of the retaining ring (or temporary retainer) 176, the annular groove 175 and the ceiling wall 123. The annular groove 175 houses the retaining ring 176 and includes the edge 175a to help open up the retaining ring 176. The ceiling wall 123 abuts against and holds the retaining ring 176 in such a fashion as to allow a radially outwardly expansion of the retaining ring 176. The deforming stress of the retaining ring 176 pushed and expanded by the edge 175a of the annular groove 175 radially outwardly to go out of the annular groove 175 is so predetermined as to sufficiently counteract the moment to separate the joint sections 14c and 15a of the hinge arm 14 and mounting plate 15 which occurs when the hood panel 10 opens/closes in a normal use, and to allow radially outwardly expansion of the retaining ring 176 when it is pushed by the edge 175a of the annular groove 175 at actuation of the gas generator 185.

The piston rod 152 is provided, on the leading end of the rod section 155 on a deployment direction, with a connecting region 156 to be jointed to the mounting plate 15. The connecting region 156 includes a round connecting hole 156a for receiving a pivot member (pivot pin) 19, and is pivotally jointed to the joint section 15a of the mounting plate 15 with the pivot member (pivot pin) 19. The pivot member 19 is put through the connecting hole 156a and pivotally jointed to the joint section 15a of the mounting plate 15.

At the bottom of the connecting region 156, an annular rubber packing 171 is disposed along the inner circumference and on the top plane of the ceiling wall 123. The packing 171 helps secure water tightness inside the cylinder 122 before operation of the actuator 121.

In the second embodiment, a lead wire extending from an unillustrated control circuit is connected to the connector 185b of the gas generator 185 in each of the actuators 121. The connecting regions 129 and 156 are jointed to the joint sections 14c of the hinge arms 14 and to the joint sections 15a of the mounting plates 15 with the pivot members 18 and 19 in the hinge mechanisms 11 located at the left and right of the hood panel 10, respectively. Thus the actuators 121 are mounted on the hinge mechanisms 11 and the hood lifting device U2 is mounted on a vehicle V.

If the actuators 121 are actuated after the hood-lifting device U2 of the second embodiment is mounted on a vehicle V, the gas generators 185 generate an actuating gas G. Then as shown in FIG. 14 (double-dotted lines to solid lines) or as shown in FIGS. 15 to 16, the pressing force of the actuating gas G pushes the rod sections 155 of the piston rods (pressing sections) 152 out of the cylinders 122 and elongates the actuators 121. When the actuators 121 are elongated, an intersection angle $\theta 0$ between the hinge arm 14 and mounting plate 15 in each of the actuators 121 is increased, such that the hood panel 10 is lifted at the rear end 10c and an ample deformation space S is provided. As a consequence, the hood panel 10 will be more deformable and capable of receiving a pedestrian with a reduced impact.

In a similar fashion to the first embodiment, in the actuator 121 of the second embodiment, the gas generator 185 is located closer to the moving central axis C than the sliding portion 152a of the piston rod (pressing section) 152. Further, the gas generator 185 is housed and held by the cylinder (housing section) 122 in such a manner as to overlap with a portion 152b (with the sliding cylinder section 159) of the piston rod 152 in an inactive state. That is, although the gas generator 185 and the piston rod 152 are arranged in series along the moving central axis C of the piston rod 152, the two also overlap in a direction orthogonal to the moving central axis C. This configuration will help shorten the length L2 of the actuator 121 by an overlapping amount of the gas generator 185 and piston rod 152 (by a long overlapping amount of the portion 152b of the pressing section 152 and a main body 186 of the gas generator 185 containing unillustrated gunpowder, an ignition device or the like), in comparison with a conventional actuator in which a gas generator and a pressing section are arranged in an unoverlapping fashion.

Therefore, similarly to the first embodiment, the actuator 121 of the second embodiment will be short in length and compact although including the gas generator 185 for generating an actuating gas G. Due to its compact configuration, the actuator 121 will improve the degree of freedom in mounting when it is mounted on a vehicle V for use in a hood lifting device U2 as a safety system.

Further, since the actuator 121 of the second embodiment is a cylinder-type actuator, it can be used in a similar way to conventional actuators. That is, the actuator 121 can replace conventional actuators and requires less mounting space.

The actuator 121 of the second embodiment also includes at the sliding portions 152a and 122a of the pressing section 152 and housing section 122 the sealing member 170 for securing gas sealing property.

At deployment of the piston rod 152, an actuating gas G emitted from the gas generator 185 is retained in a reservoir area defined by the opposing wall 158 of the housing recessed region 157 in the piston rod 152, the sliding cylinder section 159 and the circumferential wall 126 of the cylinder 122, and a gas sealing property of the reservoir area will be secured by the sealing member 170 which is mounted around the outer circumference of the sliding cylinder section 159 and slides against the inner circumferential plane 126a of the circumferential wall 126. Since the sealing member 170 is located outside of the sliding cylinder section 159, not inside of the sliding cylinder section 159 (i.e., not in an interior of the housing recessed region 157) where an actuating gas G would be retained, the sealing member 170 will not be easily exposed to a hot actuating gas G generated in an initial stage of actuation of the gas generator 185, thereby keeping good gas sealing property and being prevented from degrading in performance. As a consequence, the pressing section 152 will deploy with a steady pressing force and the actuator 121 will secure a steady output.

Of course, in the second embodiment, too, the outer circumference 155a of the rod section 155 of the piston rod 152 may be considered as the inner sliding portion 152a' to slide against the inner circumference 124a of the insert hole 124 of the ceiling wall 123 of the cylinder 122 as the outer sliding portion 122a'. If a sealing member is disposed on the inner circumference 124a, gas sealing property will be provided between the sliding portion 152a' of the pressing section 152 and the sliding portion 122a' of the housing section 122. Further, since this sealing member is also located away from an area to be directly exposed to an actuating gas generated in an initial stage of actuation of the gas generator 185, the sealing member will not be exposed to a hot actuating gas G easily, thereby keeping good gas sealing property and being prevented from degrading in performance. As a consequence, the pressing section 152 will deploy with a steady pressing force and the actuator 121 will secure a steady output.

The actuator 121 of the second embodiment includes the retraction-preventing lock mechanism BR2, too. If the piston rod 152 tries to retract after completing deployment, the tapered restricting plane 163 of the piston rod 152 pushes the lock ring 180 onto the retaining regulating plane 131 of the retaining step region 130, and the lock ring 180 abuts against the retaining regulating plane 131 and is held from retracting. Further, the outer region 180b of the lock ring 180 abuts against the outer-circumference regulating plane 132 of the retaining step region 130 while the inner region 180a abuts against the tapered restricting plane 163, thus the lock ring 180 is prevented from radially outwardly expanding and inwardly contracting. As a consequence, the lock ring 180 is steadily locked at the lock position RP located between the retaining step region 130 and the tapered restricting plane 163. Thus the piston section 153, whose tapered restricting plane 163 abuts against the lock ring 180, is locked at the lock position RP and prevented from retracting.

Accordingly, the hood lifting device U2 using the actuator 121 will be capable of receiving a pedestrian with the hood panel 10 kept at the lifted position and having a sufficient deformation space S to allow plastic deformation.

Moreover, the actuator 121 of the second embodiment includes the retaining mechanism FR2 between the ceiling wall 123 of the cylinder 122 and the rod section 155 of the piston rod 152. The retaining mechanism FR2 holds the piston rod 152 relative to the cylinder 122 and will enable the piston rod 152 to move forward relative to the cylinder 122 when an actuating gas G is generated. That is, the retaining mechanism FR2 prevents undue extension of the actuator 121 so as not to expand an intersection angle θ0 between the mounting plate 15 and hinge arm 14. Therefore, the actuator 121 will allow smooth opening/closing operation of the hood panel 10 for normal use. In cooperation with its compact configuration not requiring a large mounting space, the actuator 121 will be suitably used in the hood lifting device U2.

Of course, the actuator 121 of the second embodiment, from the joint section 14c on the hinge arm 14 to the joint section 15a on the mounting plate 15, can be mounted on a vehicle in an oblique rear- and upwardly rising fashion close to a horizontal direction, not in a vertical fashion. Therefore, the actuator 121 does not require a large mounting space in an up and down direction, and the hood lifting device U2 using the actuator 121 will be suitably mounted on a vehicle V having a large engine room ER and a limited mounting space in a height direction in vicinities of the hinge mechanisms 11.

In the second embodiment, too, the gas generator 185 is so disposed as to leave a clearance between the leading end 185a for emitting an actuating gas G and the opposing wall 158 of the piston rod 152 such that a reservoir 190 is formed in the clearance for retaining an actuating gas G before deployment of the piston rod 152. The reservoir 190 will help reduce a rate of change of volume between the leading end 185a and opposing wall 158 at deployment of the piston rod 152. Therefore, the actuator 121 will prevent a pressure lowering of a combustion gas or actuating gas G in the course of deployment of the piston rod 152, and will exert a great pressure and move the piston rod 152 forward even at a vicinity of the completion position of the deployment.

Figure 17:
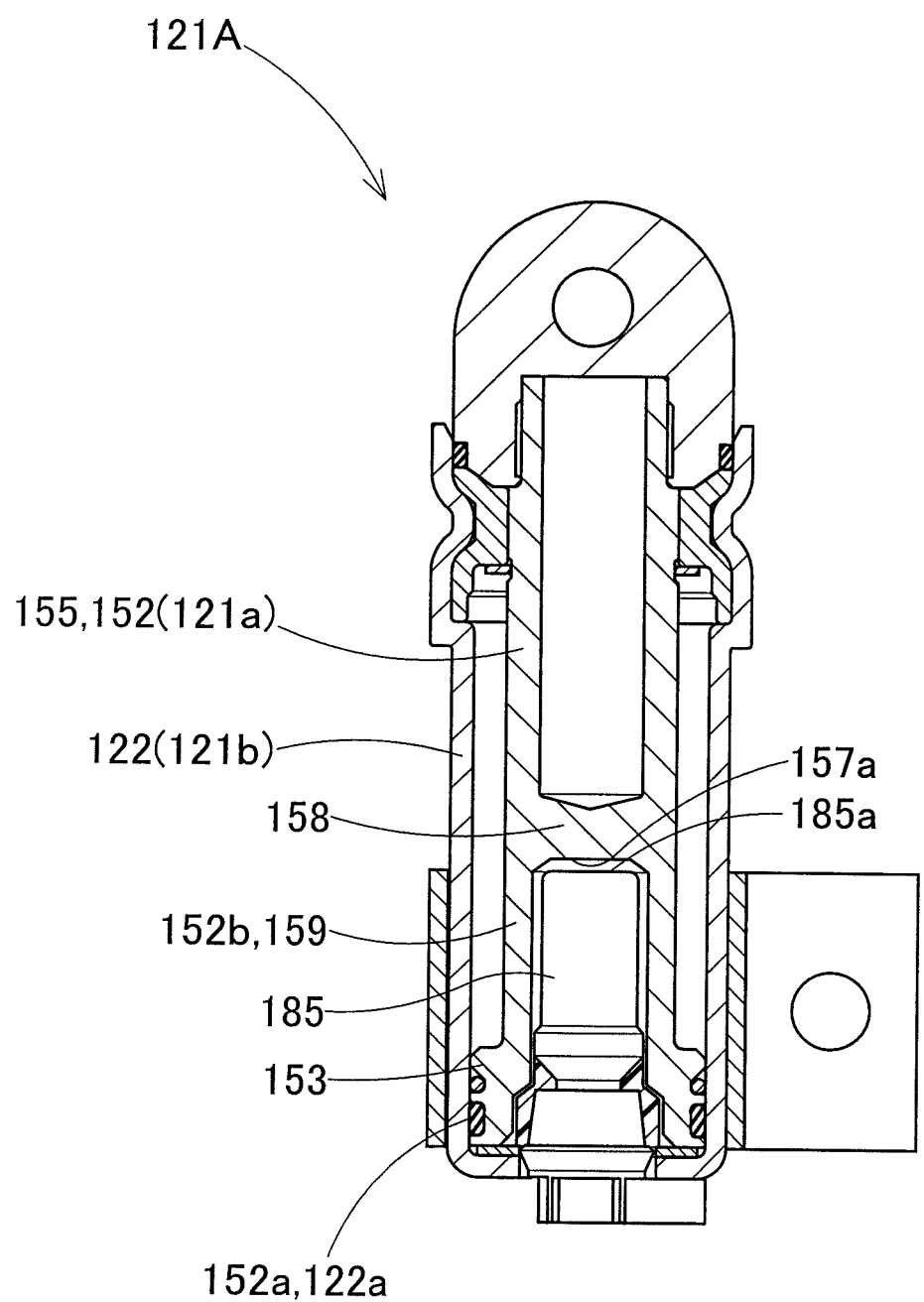
FIG. 17 is a vertical section of a modification of the actuator of the second embodiment.

Without considering such an advantage, the opposing wall 158 may be so disposed as to be aligned with the leading end 185a of the gas generator 185 like an actuator 121A shown in FIG. 17.

Also in the second embodiment, the connecting region 129 of the cylinder (housing section) 122 of the actuator 121 is jointed to the hinge arm 14 while the connecting region 156 of the piston rod (pressing section) 152 is jointed to the mounting plate 15. However, the mounting may be reversed, i.e., the connecting region 129 of the cylinder 122 may be jointed to the jointing section 15a of the mounting plate 15 while the connecting region 156 of the piston rod 152 to the joint section 14c of the hinge arm 14.

Figure 18:
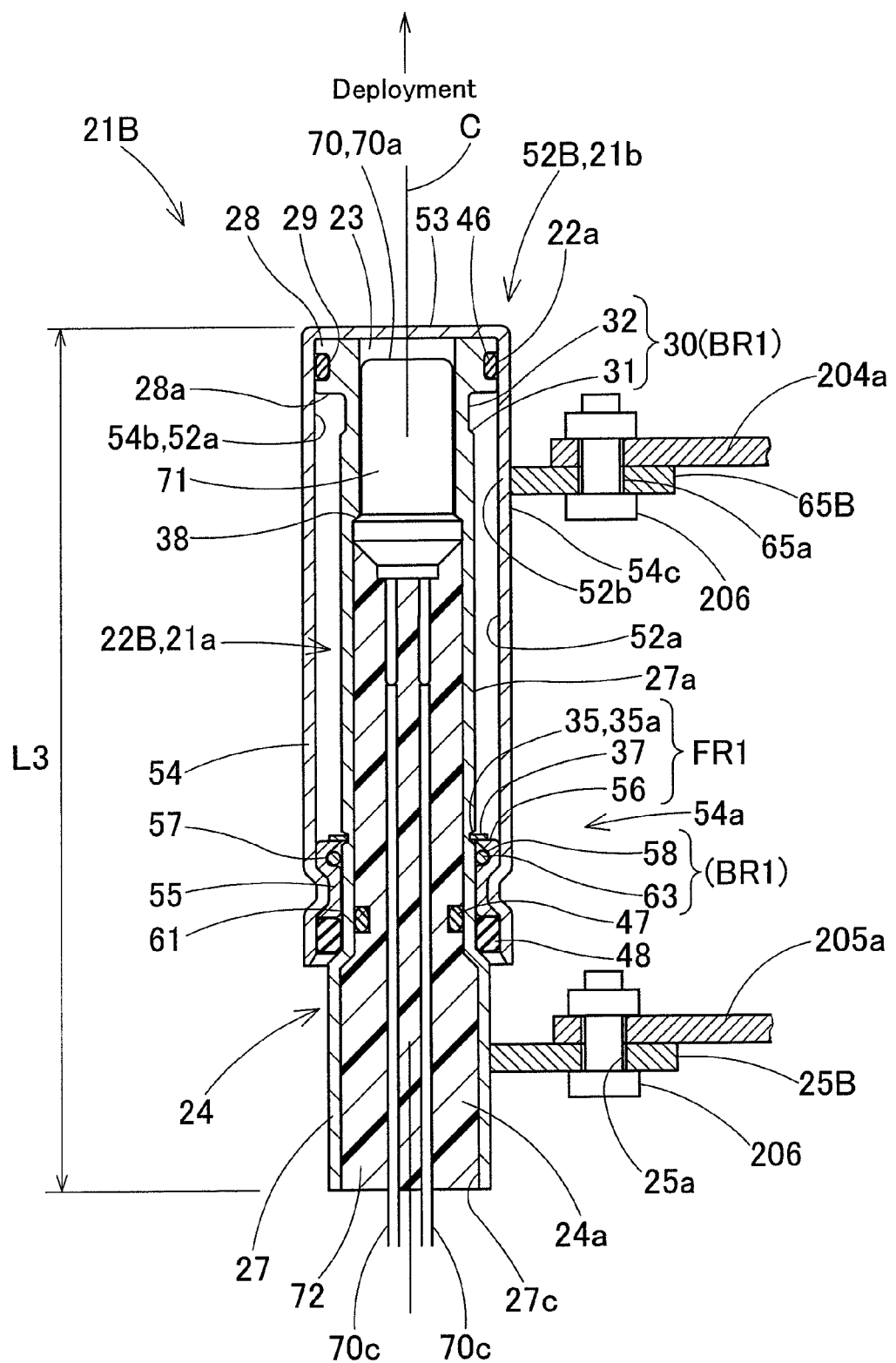
FIG. 18 is a vertical section of an actuator according to the third embodiment of the invention.
Figure 19:
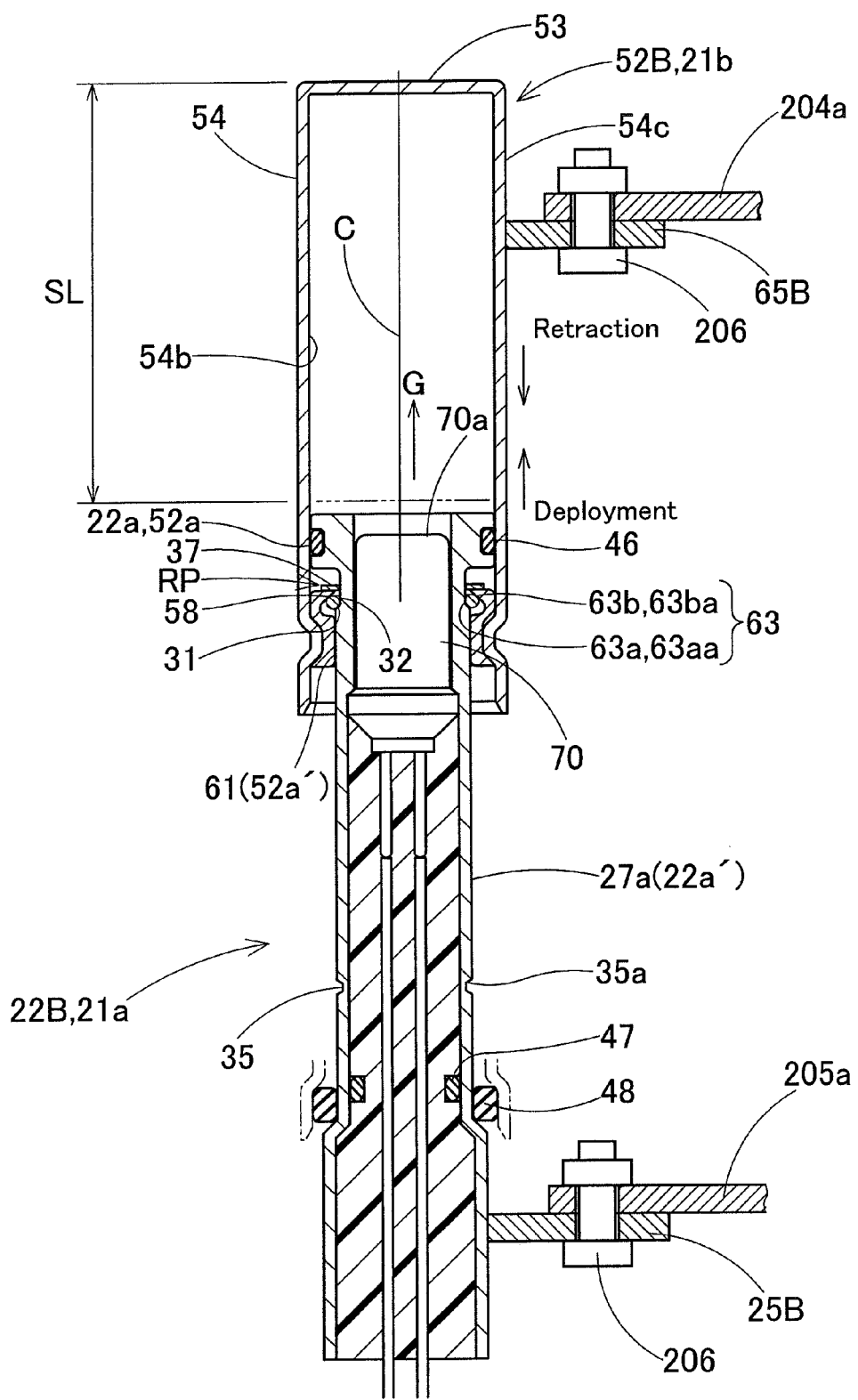
FIG. 19 is a vertical section of the actuator of the third embodiment in service.
Figure 20:
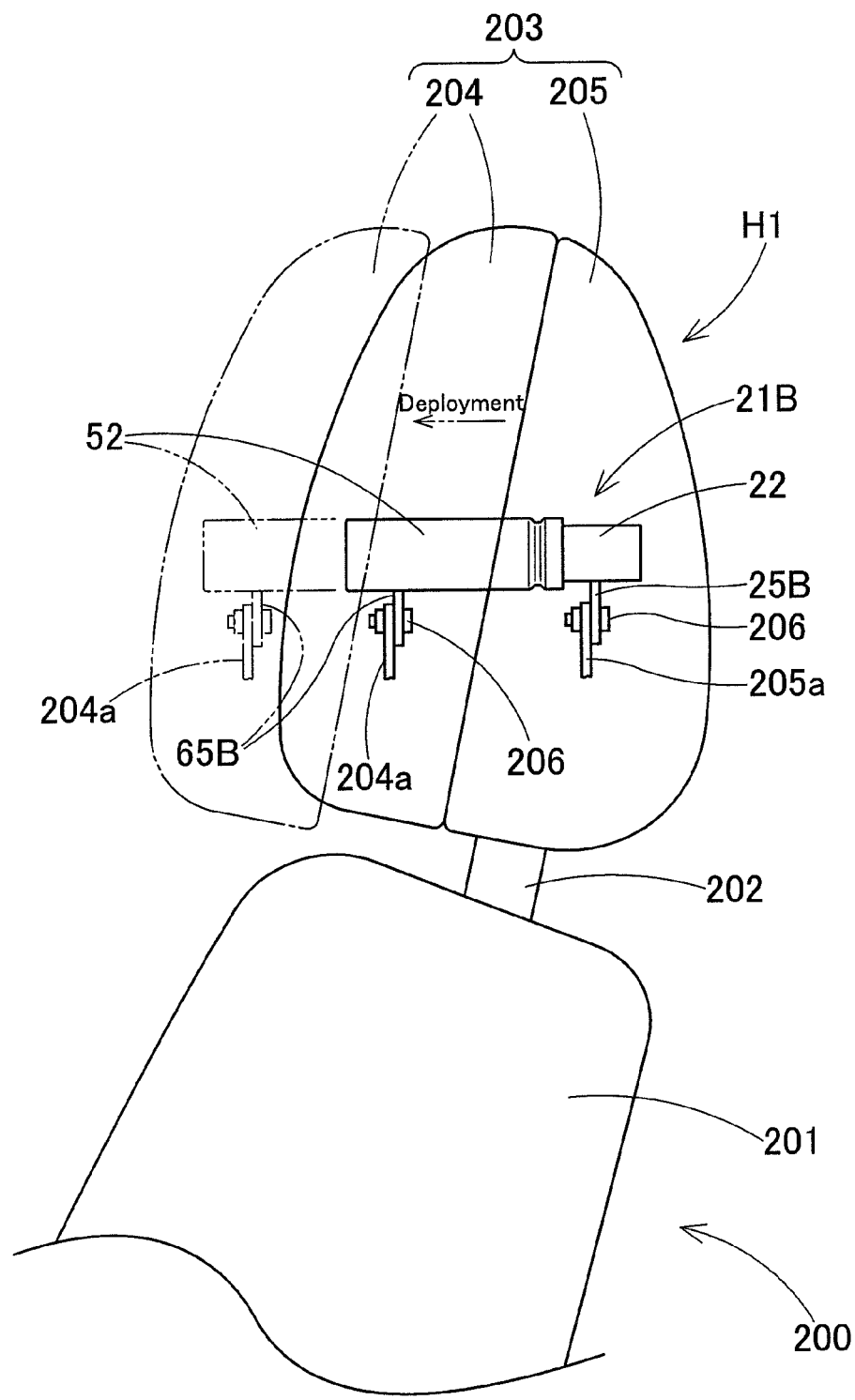
FIG. 20 depicts a head-protecting device using the actuator of the third embodiment.

In the first and second embodiments, the connecting region 65/156 to be jointed to the joint section (i.e., the pressing-side joint section) 15a of the mounting plate 15 is located at the leading end of the pressing section 52/152 on a deployment direction. However, the connecting region of the pressing section may be so located on an outside 54c of a circumferential wall 54 of the pressing section as to extend toward a direction orthogonal to a moving central axis C, as in an actuator 21B according to the third embodiment shown in FIGS. 18 to 20. This connecting region 65B is comprised of a bracket and jointed to a pressing-side joint section (joint section) 204a.

In the third embodiment, the connecting region 25B of the housing section 22B is also a bracket and located at a root region 24a facing away from an opening end 23 for joint to a housing-side joint section (joint section) 205a. The connecting regions 65B and 25B include a joint hole 65a and a joint hole 25a and are secured to the corresponding joint sections 205a and 204a, respectively, with such joint members 206 as bolts and nuts inserted through the joint holes 65a and 25a.

The actuator 21B according to the third embodiment of the invention is used in a head-protecting device H1 which is mounted on a headrest 203 located at the top of a backrest 201 of a seat 200 of a vehicle. The actuator 21B is designed to so operate that the headrest 203 receives a head of an occupant as an object of protection adequately in the event of a back impact in which a collision occurs at the back of a vehicle. The headrest 203 is disposed at the top of the backrest 201 with a stay 202 and includes a front region 204 and a rear region 205. The front region 204 is jointed to and supported by the pressing section 52B with the joint section 204a and connecting region 65B, and the rear region 205 is supported by the stay 202 and jointed to the housing section 22B with the joint section 205a and connecting region 25B.

When the actuator 21B is actuated, the front region 204, which was in close contact with the rear region 205, deploys forward. The actuator 21B is actuated by a predetermined control circuit in response to a signal fed to the circuit from a sensor disposed in a vicinity of a rear bumper of a vehicle for detecting a back impact.

In the third embodiment, the configurations of the connecting regions 25B and 65B differ from those of the connecting regions 25 and 65 in the first embodiment. However, configurations of other regions of the actuator 21B including a lock mechanism BR1 and a retaining mechanism FR1 are similar to those of the first embodiment, and therefore, members and sections similar to the first embodiment will be assigned common reference numerals with the first embodiment or common reference numerals plus symbols B, and detailed descriptions will be omitted.

In the actuator 21B of the third embodiment, the connecting region 65B of the pressing section 52B to be jointed to the pressing-side joint section 204a is disposed in such a manner as to protrude from the outer circumference 54c toward a direction orthogonal to the moving central axis (the axial center) C. With this configuration, the connecting region 65B is not located in a length direction of the actuator 21B on the moving central axis (axial center) C, and therefore, the length L3 of the actuator 21B will be shorter by a length of the connecting region 65B.

Further, since the connecting region 25B of housing section 22B to be jointed to the housing-side joint section 205a is also disposed in such a manner as to protrude from an outer circumference 27a of the root region 24a toward a direction orthogonal to the moving central axis (axial center) C, the length L3 of the actuator 21B will be even shorter by a length of the connecting region 25B.

Figure 21:
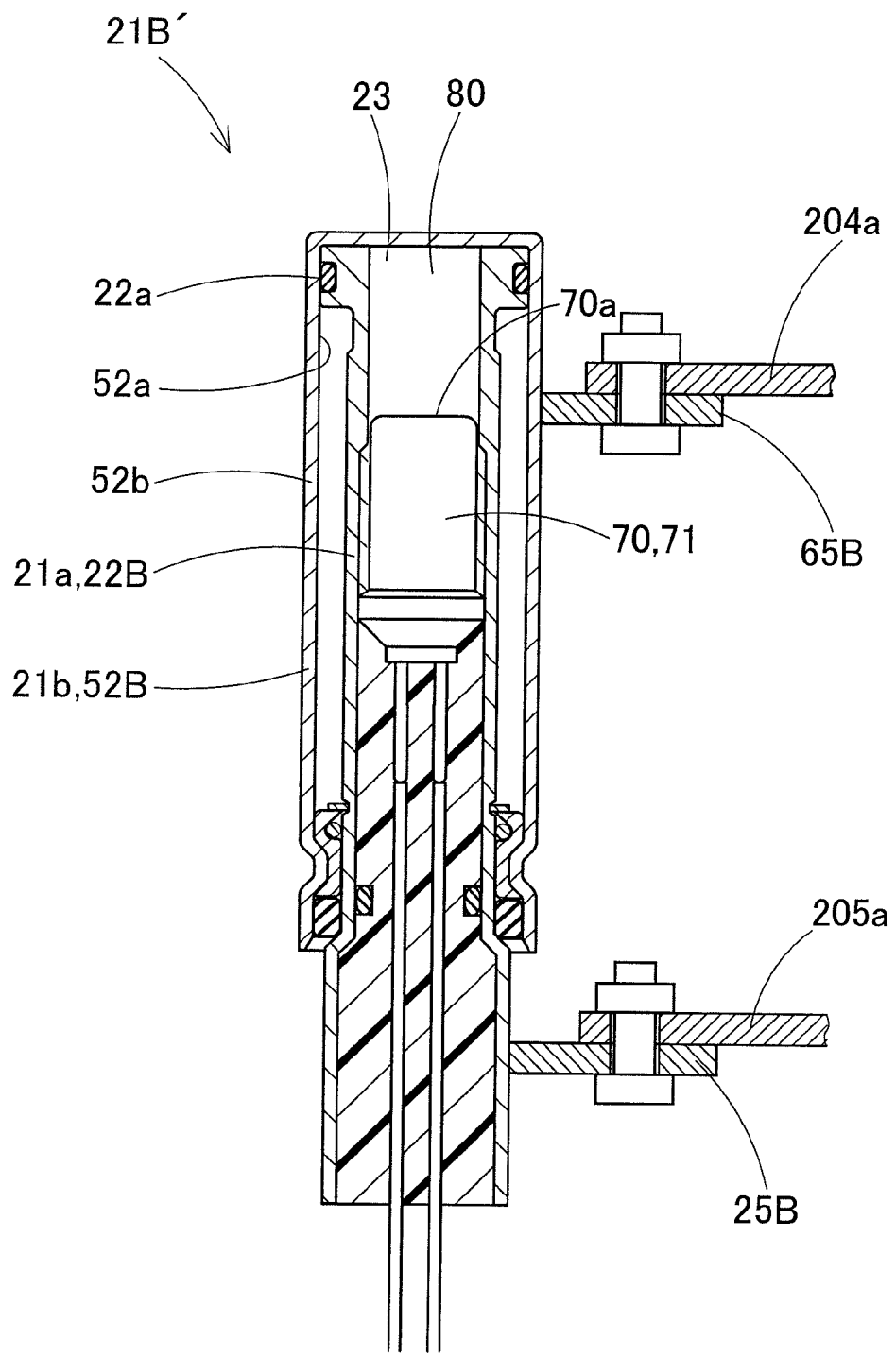
FIG. 21 is a vertical section of a modification of the actuator of the third embodiment.

In the actuator 21B of the third embodiment, a leading end 70a of the gas generator 70 for emitting an actuating gas G and the opening end 23 of the housing section 22B are generally aligned. However, a clearance may be provided between the opening end 23 and the leading end 70a of the gas generator 70 so as to form a reservoir 80, as in an actuator 21B' shown in FIG. 21.

Although the connecting regions 25B and 65B in the third embodiment include the connecting hole 25a/65a for receiving a joint member 206, respectively, the connecting regions may also be configured with no connecting holes. By way of example, in an actuator 21C according to the fourth embodiment shown in FIGS. 22 to 25, connecting regions are comprised of bolts. That is, the configuration of the connecting regions should not be limited to those disclosed in the first to third embodiments.

The actuator 21C of the fourth embodiment is used in a hood lifting device U3. In the actuator 21C, a connecting region 65C is comprised of a bolt and fixedly mounted on an outer circumference 54c of a circumferential wall 54 of a pressing section (or a moving section) 52C as an outer member 21b. The connecting region 65C is inserted into a joint hole 15b of a joint section 15a formed on a mounting plate 15 of a hinge mechanism 11 and is fastened by a nut 15c, thus jointed to the mounting plate 15 in a rotatable fashion.

A connecting region 25C of a housing section 22C as an inner member 21a includes a connecting hole 25a formed into a hexagonal hole. A pivot member 18C is inserted into the connecting hole 25a. The pivot member 18C includes at opposite ends male screw regions 18a and 18b, and is jointed with the connecting region 25C at the male screw region 18a which is fastened by a nut 18e.

The pivot member 18C further includes between the male screw regions 18a and 18b an odd-shaped region which is formed into a hexagonal prism and fitted in the hexagonal connecting hole 25a and a large diameter region 18d which is columnar in shape. The male screw region 18b is inserted into a joint hole 14d of a joint section 14c formed on a hinge arm 14 and fastened with a nut 14e, thus the pivot ember 18C is jointed to the hinge arm 14 in a rotatable fashion.

Thus, the actuator 21C of the fourth embodiment is rotatably jointed to the joint section 14c of the hinge arm 14 with the pivot member 18C and nuts 18e and 14e while being rotatably jointed to the joint section 15a of the mounting plate 15 with the nut 15c.

In the fourth embodiment, unless otherwise specified, members and sections similar to the first embodiment will be assigned common reference numerals with the first embodiment, and detailed descriptions on those members will be omitted.

In the actuator 21C of the fourth embodiment, the housing section 22C includes at the leading end an opening end 23 for releasing an actuating gas G therefrom and houses a gas generator 70, similarly to the first embodiment. Further, the housing section 22C includes on the outer circumference a sliding portion (inner sliding portion, inner section) 22a, thus serves as the inner member 21a. The pressing section 52C includes a ceiling wall 53 covering the opening end 23 of the housing section 22C and the circumferential wall 54 which covers a region of the housing section 22C from an outer circumferential edge of the ceiling wall 53 and up to at least the region where the gas generator 70 is located. An inner circumferential plane 54b of the circumferential wall 54 slides against the inner sliding portion 22a of the housing section 22C and serves as a sliding portion (outer sliding portion, outer section) 52a. That is, the pressing section 52C constitutes the outer member 21b which surrounds the housing section 22C as the inner member 21a.

Moreover, the gas generator 70 with a similar configuration to the first embodiment is located closer to a moving central axis C of the pressing section 52C than the sliding portion (i.e., the inner circumference 54b of the circumferential wall 54) 52a of the pressing section 52C. Further, the gas generator 70 is housed and held by the housing section 22C in such a manner as to overlap with a portion 52b of the pressing section 52C in an inactive state in a direction orthogonal to the moving central axis C.

In a similar fashion to the first embodiment, the actuator 21C is provided with a retaining mechanism (or an extension-preventing lock mechanism) FR1. The retaining mechanism FR1 includes an annular groove 35 formed on the housing section 22C, a retaining ring (temporary retainer) 37 which is comprised of an E-ring fitted in the annular groove 35 and a leading-end flange 56 which abuts against and is retained by the retaining ring 37 housed in the annular groove 35. When the actuator 21C is actuated, the leading-end-flange 56 pushes the retaining ring 37, expands the retaining ring 37 radially outwardly with the aid of a peripheral region 35a of the annular groove 35 and lets the ring 37 out of the annular groove 35. That is, the leading end-flange 56 serves as a retained region which concurrently acts to break out of the retention by the retaining ring 37. The deforming stress of the retaining ring 37 pushed and expanded radially outwardly by the leading-end flange 56 to go out of the annular groove 35 is so predetermined as to sufficiently counteract the moment to separate the joint sections 14c and 15a of the hinge arm 14 and mounting plate 15 at opening/closing of the hood panel 10 at normal use, and to allow radially outwardly expansion of the retaining ring 37 when it is pushed by the leading-end flange 56 at actuation of the gas generator 70.

The actuator 21C includes a retraction-preventing lock mechanism BR3 that prevents the pressing section 52C from retracting after having completed deployment. However, unlike the first embodiment, a lock ring 63C, which is comprised of a C-ring of spring steel or the like which has a round cross section and is elastically deformable, is housed in a housing groove 49 formed on a flange 28C of the housing section 22C in a radially outwardly expandable fashion, and a retaining step region 67 for retaining the lock ring 63 as is radially outwardly expanded is formed on the pressing section 52C.

Figure 25A:
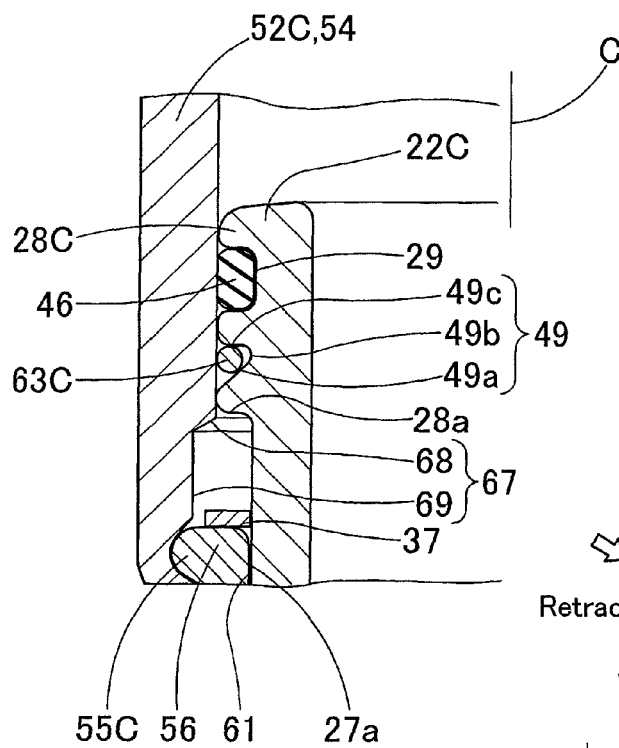
FIGS. 25A to 25C are enlarged partial sections depicting in order the behavior of a lock mechanism at completion of operation of the actuator of the fourth embodiment.

The flange 28C is located in a periphery of the opening end 23 of the housing section 22C, and the housing groove 49 is formed on an outer circumference of the flange 28C of the housing section 22C. The flange 28C bumps against a ring holder 55c formed on a leading end 54a of the circumferential wall 54 of the pressing section 52C, with the retaining ring 37 interposed there between at deployment, and serves as a stopper to stop a further movement of the pressing section 52. Specifically, the housing groove 49 is located between a regulating plane 28a serving as the stopper and an annular groove 29 which houses a sealing member 46. As shown in FIG. 25A, the housing groove 49 includes a bottom plane 49b located toward an axial center C, a step plane 49c which extends in a direction orthogonal to the axial center C from an edge of the bottom plane 49b toward the annular groove 29, and a tapered restricting plane 49a which extends toward a retraction direction from an edge of the bottom plane 49b toward the regulating plane 28a while radially outwardly expanding at an inclined angle of generally 45°.

The retaining step region 67 is formed next to the ring holder 55C on the inner circumference 54b of the pressing section 52C. The retaining step region 67 includes an outer-circumference regulating plane 69 and a retaining regulating plane 68. The outer-circumference regulating plane 69 is a bottom plane of the retaining step region 67, which is a circular arc face parallel to the axial center C. The retaining regulating plane 68 is a tapered plane which extends from an edge of the outer-circumference regulating plane 69 on a deployment direction and continues to the inner circumference 54b while radially inwardly contracting.

Figure 25B:
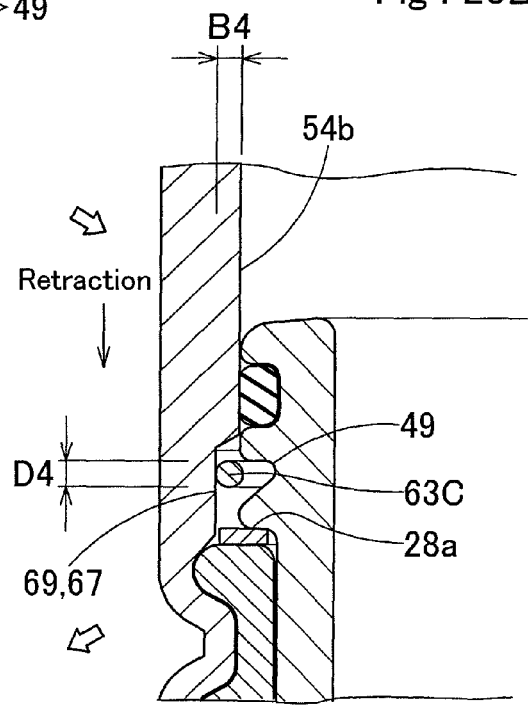

In the retraction-preventing lock mechanism BR3 of the fourth embodiment, the lock ring 63C is housed in the housing groove 49 in such a state that is radially inwardly contracted to contact the inner circumference 54b of the pressing section 52C. When the pressing section 52C is completely deployed, as shown in FIGS. 25A and 25B, the lock ring 63C is radially outwardly expanded and housed in the retaining step region 67 of the pressing section 52C. The diameter D4 of a cross-sectional surface of the lock ring 63C is greater than a width B4 of the retaining regulating plane 68 of the retaining step region 67 (i.e., a width between the outer-circumference regulating plane 69 and inner circumference 54b). A half of the diameter D4, i.e., the radius of the cross-sectional surface of the lock ring 63C, is generally equal to or slightly smaller than the width B4 of the retaining regulating plane 68.

Figure 25C:
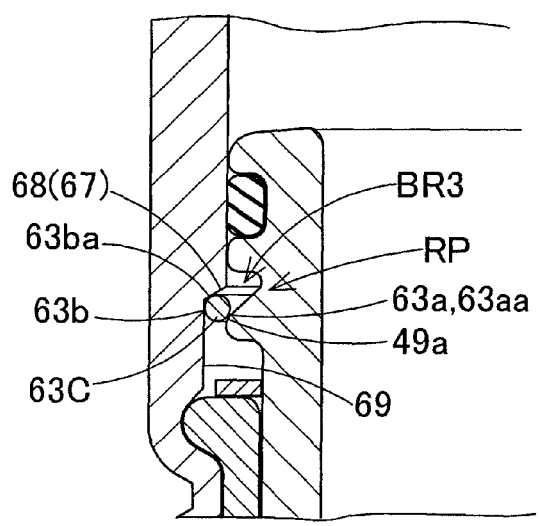

With this configuration, if the lock ring 63C is housed in the retaining step region 67, it abuts against the outer-circumference regulating plane 69 of the retaining step region 67 and an inner region 63a of the lock ring 63C protrudes out of the inner circumference 54b of the pressing section 52C. Further, when the lock ring 63C is housed in the retaining step region 67 and the pressing section 52C tries to retract after having completely deployed, the retaining regulating plane 68 of the pressing section 52C bumps against the lock ring 63, and the lock ring 63 hits and is held by the tapered restricting plane 49a. That is, the lock ring 63C is held between the retaining regulating plane 68 and tapered restricting plane 49a, as shown in FIG. 25C.

As a consequence, although the pressing section 52C is likely to retract after having completely deployed, at a lock position RP of the pressing section 52C, the tapered restricting plane 49a of the housing section 22 hits the inner region 63a of the lock ring 63C and an outer region 63b of the lock ring 63C is prevented from expanding by the outer-circumference regulating plane 69, and the lock ring 63C is securely retained by the retaining regulating plane 68, thereby the retraction of the pressing section 52C is prevented. Thus, in the fourth embodiment, the retraction-preventing lock mechanism BR3 that prevents the pressing section 52C from retracting after having completed deployment is composed of the retaining step region 67 on the part of the pressing section 52C, which includes the retaining regulating plane 68 and outer-circumference regulating plane 69, the tapered regulating plane 49a of the housing groove 49 on the part of the housing section 22C, and the lock ring (retraction preventing member) 63C housed in the housing groove 49 in a radially outwardly biased state.

Figure 22:
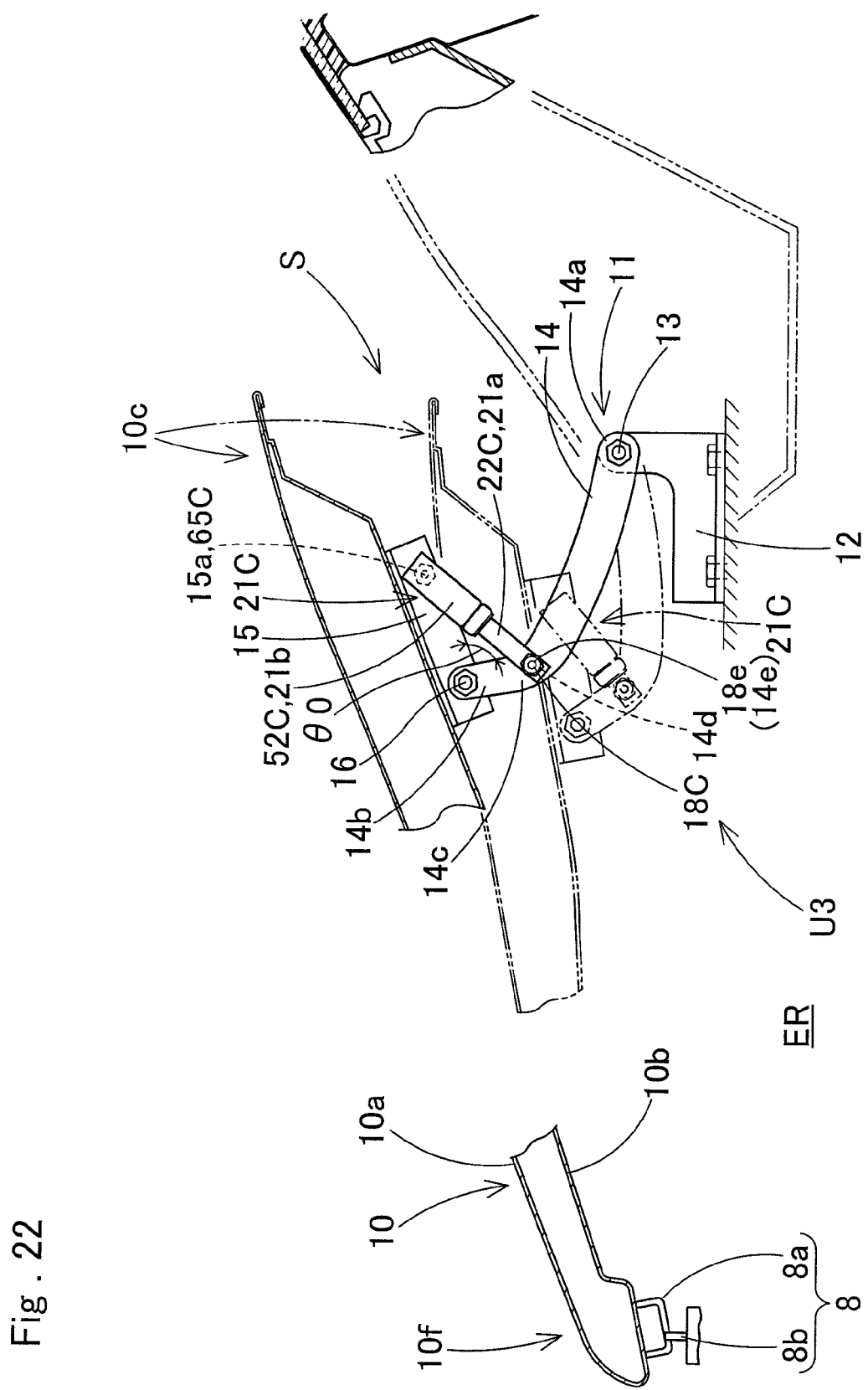
FIG. 22 is a schematic vertical section of a vehicle showing an actuator of the fourth embodiment in service.
Figure 23:
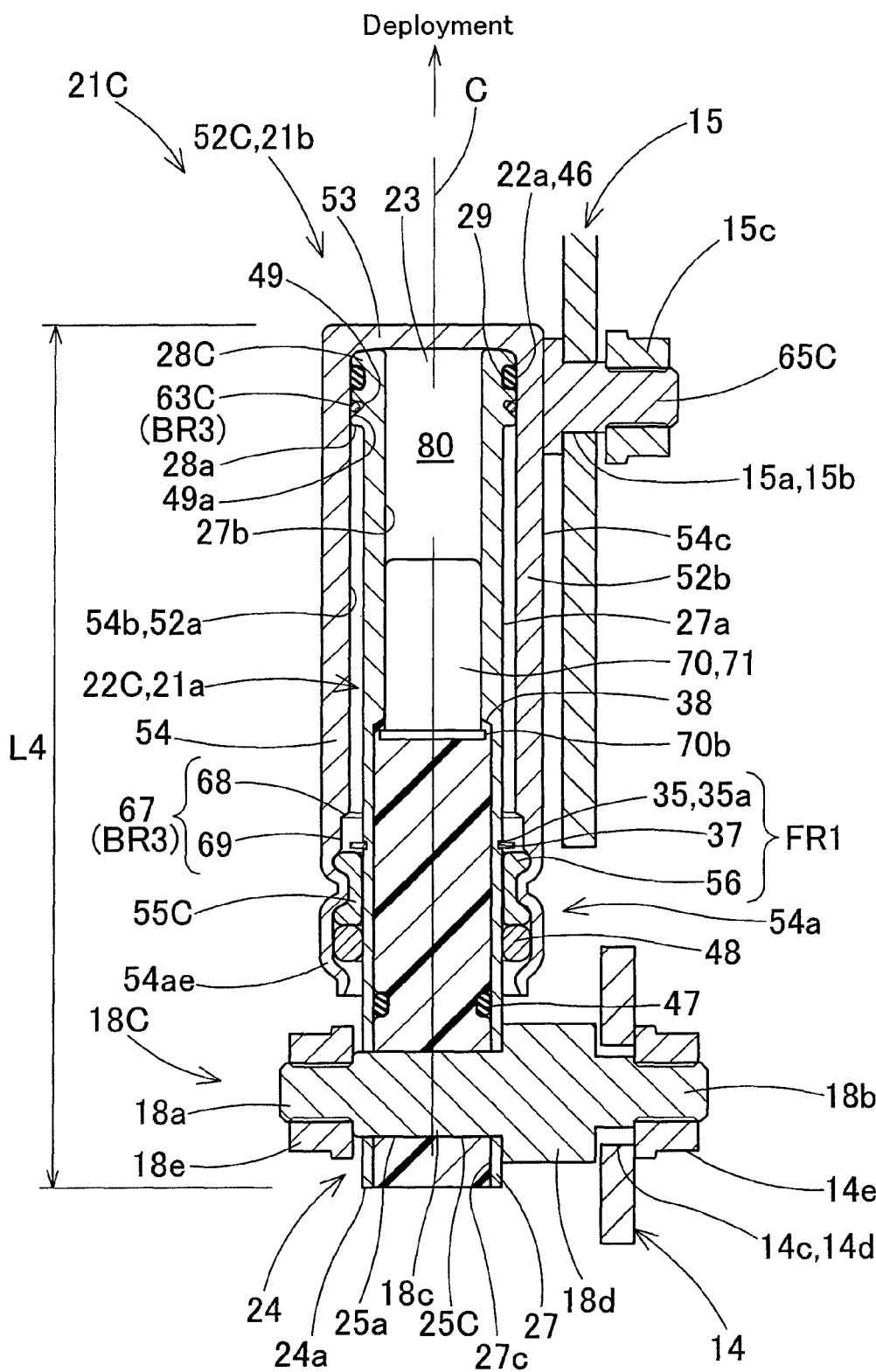
FIG. 23 is a vertical section of the actuator of the fourth embodiment.
Figure 24:
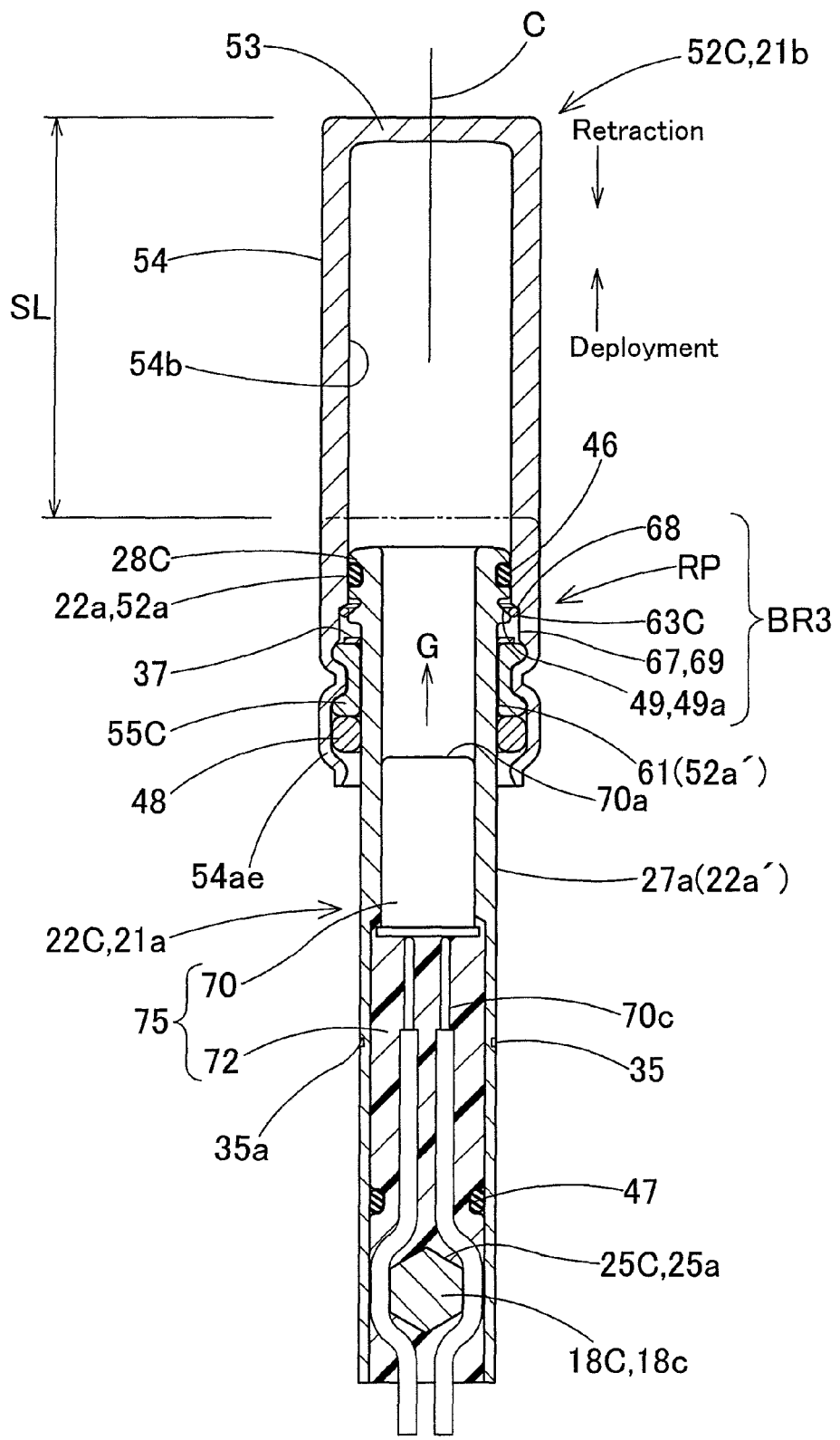
FIG. 24 is a vertical section of the actuator of the fourth embodiment in service, showing a state where the actuator is rotated 90° about an axial center from the state in FIG. 23.

In operation of the hood lifting device U3, if the actuators 21C mounted on left and right sides of a hood panel 10 of a vehicle are actuated, the gas generators 70 generate an actuating gas G. Then as shown in FIG. 22 (double-dotted lines to solid lines) or FIGS. 23 to 24, the pressing force of the actuating gas G separates the pressing section 52C in each of the actuators 21C away from the housing section 22C and elongates the actuator 21C. When the actuators 21C are elongated, an intersection angle θ0 between the hinge arm 14 and mounting plate 15 in each of the actuators 21C is increased, such that the hood panel 10 is lifted at the rear end 10c and an ample deformation space S is provided. As a consequence, the hood panel 10 will be more deformable and will be capable of receiving a pedestrian with a reduced impact.

The actuator 21C of the fourth embodiment will exert the same working effect as the first embodiment. Further, similarly to the third embodiment, the connecting region 65C of the fourth embodiment is so configured as to extend in a direction orthogonal to the moving central axis C in a protruding fashion. This configuration will shorten the length L4 of the actuator 21C and enable the hood lifting device U3 to be mounted in a limited mounting space in a vicinity of the hinge mechanism 11 of the hood panel 10 of a vehicle V. Therefore, the actuator 21C will be suitably used in the hood lifting device U3.

In the fourth embodiment, the lock ring 63C is disposed on the flange 28C of the housing section 22C. When the housing section 22C and pressing section 52C are assembled, the lock ring 63C is already fitted in the housing groove 49 and slides against the inner circumference 54b of the pressing section 52C, which is not exposed on the outside of the pressing section 52C. However, the packing 48 is located at the leading end 54a of the circumferential wall 54 at finishing the assembly, and will prevent rusting of the circumferential wall 54b if the wall 54b has a damage from the assembling.

Here, the pressing section 52C and housing section 22C are assembled together by swaging. The retaining ring 37 has been preliminarily fitted in the annular groove 35 of the housing section 22C, and the pressing section 52C, to which the ring holder 55C is not yet attached, is assembled with the housing section 22C. Then the ring holder 55C and packing 48 are set inside the leading end 54a, and the leading end 54a is swaged, thus the ring holder 55C and packing 48 are fixed to the leading end 54a of the circumferential wall 54.

In the first to fourth embodiments, the housing section 22/22B/22C/122 and the pressing section 52/52B/52C/152 include the connecting region 25/25B/25C/129 and connecting region 65/65B/65C/156, respectively, which are jointed to the housing-side joint section 14c/205a and the pressing-side joint section 15a/204a prior to actuation of the actuator. However, it will also be appreciated that at least either the housing section 22/22B/22C/122 or the pressing section 52/52B/52C/152 is fixedly jointed to a fixed joint section whereas the other is located at a distance from a movable joint section, which is located away from the fixed joint section, such that the latter contacts (or connects to) and supports or moves the movable joint section upon actuation. This configuration will require a lead wire 70c to feed the gas generator 70/185 with an igniting electric signal, and if considering the wiring of the lead wire 70c and a space for a moving section of the actuator to move, it will be desired that the housing section 22/22B/22C/122 is jointed to the fixed joint section (housing-side joint section) and the pressing section 52/52B/52C/152 is located at a distance from a movable joint section to contact (or connect to) the movable joint section at deployment.

Although the actuator 21/21B/21C/121 of the foregoing embodiments has been described as is used in the hood lifting device U1/U2/U3 or in the head-protecting device H1, the application of the present invention should not be limited thereby. The invention may be applied to such an actuator that a housing section and a pressing section are jointed to a knee-cushioning panel located in front of a driver's seat and to an instrument panel of a vehicle body structure, respectively, such that the actuator deploys the knee-cushioning panel rearward in the event of a frontal collision of a vehicle. That is, the invention may be applied to various safety devices for a vehicle using an actuator operable with a gas generator to deploy a pressing section at a predetermined timing.

What is claimed is:

1. An actuator comprising:
a gas generator that generates an actuating gas when actuated;
a housing section that houses and holds the gas generator; and
a pressing section that is deployable, when pressed by an actuating gas generated by the gas generator, in such a fashion as to move forward relative to the housing section, the pressing section comprising a sliding portion that is slidable against a sliding portion of the housing section such that the pressing section and the housing section are slidable against each other, wherein either one out of the sliding portions of the pressing section and housing section serves as an inner section that is located closer to a central axis of the pressing section than the other whereas the other out of the sliding portions of the pressing section and housing section serves as an outer section that surrounds the inner section, the gas generator is located closer to the central axis than the sliding portion of the pressing section and partially overlaps with a part of the pressing section in an inactive state in a direction orthogonal to the central axis, the housing section includes at a leading end thereof an opening end for releasing an actuating gas and houses the gas generator, the sliding portion of the housing section is located on an outer circumference of the housing section and constitutes the inner section, the housing section serves as an inner member, the pressing section includes a ceiling wall that covers the opening end of the housing section and a circumferential wall that covers a region of the outer circumference of the housing section from an outer peripheral edge of the ceiling wall up to at least an area where the gas generator is located, the sliding portion of the pressing section is comprised of an inner circumference of the circumferential wall and constitutes the outer section, and the pressing section serves as an outer member that surrounds the housing section as the inner member.

2. The actuator according to claim 1, further comprising a sealing member that is located at the sliding portions of the pressing section and housing section and that provides a gas-tight seal.

3. The actuator according to claim 1, wherein the pressing section includes on an outer circumference thereof a connecting region that extends in a direction orthogonal to the central axis so as to be jointed to a pressing-side joint section of a vehicle whereas the housing section is adapted to be jointed to a housing-side joint section of the vehicle, such that the actuator is operable to elongate a distance between the housing-side joint section and the pressing-side joint section.

4. The actuator according to claim 1, further comprising a packing that is located between an inner circumference of the circumferential wall of the pressing section at a leading end facing away from the ceiling wall and an outer circumference of a root region of the housing section located away from the opening end.

* * * * *